US012621811B2

(12) United States Patent
Takahashi et al.

(10) Patent No.: US 12,621,811 B2
(45) Date of Patent: May 5, 2026

(54) TERMINAL, BASE STATION, AND RADIO COMMUNICATION METHOD

(71) Applicant: NTT DOCOMO, INC., Tokyo (JP)

(72) Inventors: Yuki Takahashi, Tokyo (JP); Shohei Yoshioka, Tokyo (JP); Masaya Okamura, Tokyo (JP); Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 350 days.

(21) Appl. No.: 18/266,746

(22) PCT Filed: Dec. 25, 2020

(86) PCT No.: PCT/JP2020/048975
§ 371 (c)(1),
(2) Date: Jun. 12, 2023

(87) PCT Pub. No.: WO2022/137569
PCT Pub. Date: Jun. 30, 2022

(65) Prior Publication Data
US 2024/0049191 A1 Feb. 8, 2024

(51) Int. Cl.
*H04W 72/044* (2023.01)
*H04W 72/20* (2023.01)

(52) U.S. Cl.
CPC ......... *H04W 72/044* (2013.01); *H04W 72/20* (2023.01)

(58) Field of Classification Search
CPC ............................ H04W 72/044; H04W 72/20
See application file for complete search history.

(56) References Cited

U.S. PATENT DOCUMENTS

| | | | | |
|---|---|---|---|---|
| 8,767,846 B2 * | 7/2014 | Chen | ..................... | H04L 5/0037 |
| | | | | 375/295 |
| 8,995,376 B2 * | 3/2015 | Pan | ..................... | H04W 52/146 |
| | | | | 370/329 |
| 9,124,406 B2 * | 9/2015 | Chen | ..................... | H04L 5/0053 |
| 9,125,188 B2 * | 9/2015 | Tamaki | ................. | H04L 5/0091 |
| 9,178,670 B2 * | 11/2015 | Lee | ......................... | H04L 5/0023 |

(Continued)

FOREIGN PATENT DOCUMENTS

| | | |
|---|---|---|
| JP | 2019-536371 A | 12/2019 |
| WO | 2018/043562 A1 | 3/2018 |

(Continued)

OTHER PUBLICATIONS

International Search Report issued in PCT/JP2020/048975 on Jul. 20, 2021 (3 pages).

(Continued)

*Primary Examiner* — Fahmida S Chowdhury
(74) *Attorney, Agent, or Firm* — Osha Bergman Watanabe & Burton LLP

(57) ABSTRACT

A terminal comprises: a reception unit that receives a first control information by a first control channel on a first carrier and a second control information by a second control channel on a second carrier; and a control unit that controls a reception of the second control channel based on the first control information, and controls a communication of data based on the second control information.

5 Claims, 16 Drawing Sheets

(56) References Cited

U.S. PATENT DOCUMENTS

| | | | | |
|---|---|---|---|---|
| 2013/0142141 A1* | 6/2013 | Dinan | H04W 72/20 |
| | | | 370/329 |
| 2014/0185537 A1* | 7/2014 | Papasakellariou | |
| | | | H04W 72/0453 |
| | | | 370/329 |
| 2014/0233503 A1* | 8/2014 | Aiba | H04L 1/1812 |
| | | | 370/329 |
| 2014/0286288 A1* | 9/2014 | Park | H04W 72/23 |
| | | | 370/329 |
| 2016/0037543 A1* | 2/2016 | Papasakellariou | H04W 88/02 |
| | | | 370/329 |
| 2018/0287845 A1* | 10/2018 | Kim | H04L 5/0048 |
| 2019/0215818 A1 | 7/2019 | Takeda et al. | |
| 2020/0145131 A1* | 5/2020 | Peng | H04L 5/0053 |
| 2020/0145968 A1* | 5/2020 | Yang | H04L 1/0046 |
| 2020/0229169 A1* | 7/2020 | Wilson et al. | H04W 24/10 |
| 2020/0413295 A1* | 12/2020 | Li | H04W 76/14 |
| 2021/0067205 A1* | 3/2021 | Manolakos | H04L 5/0053 |
| 2021/0112563 A1* | 4/2021 | Hua | H04L 5/0094 |
| 2021/0144745 A1* | 5/2021 | Yang | H04L 5/0053 |
| 2021/0227514 A1 | 7/2021 | Takeda et al. | |
| 2021/0314994 A1* | 10/2021 | Ang | H04L 5/001 |
| 2022/0094510 A1* | 3/2022 | Zhang | H04L 5/0023 |
| 2022/0200774 A1* | 6/2022 | Yang | H04L 5/0092 |
| 2022/0312440 A1* | 9/2022 | Bagheri | H04W 72/044 |
| 2024/0049191 A1* | 2/2024 | Takahashi | H04W 72/20 |

FOREIGN PATENT DOCUMENTS

| | | |
|---|---|---|
| WO | 2019/215932 A1 | 11/2019 |
| WO | 2020/039483 A1 | 2/2020 |

OTHER PUBLICATIONS

Written Opinion of the International Searching Authority issued in PCT/JP2020/048975 on Jul. 20, 2021 (4 pages).

Qualcomm; "New WID on Extending current NR operation to 71 GHz"; 3GPP TSG RAN Meeting #86, RP-193229; Sitges, Spain; Dec. 9-12, 2019 (5 pages).

\* cited by examiner

200 slot

Carrier #1

Carrier #2 slot

···1st stage control channel

···2nd stage control channel

···data

FIG.11

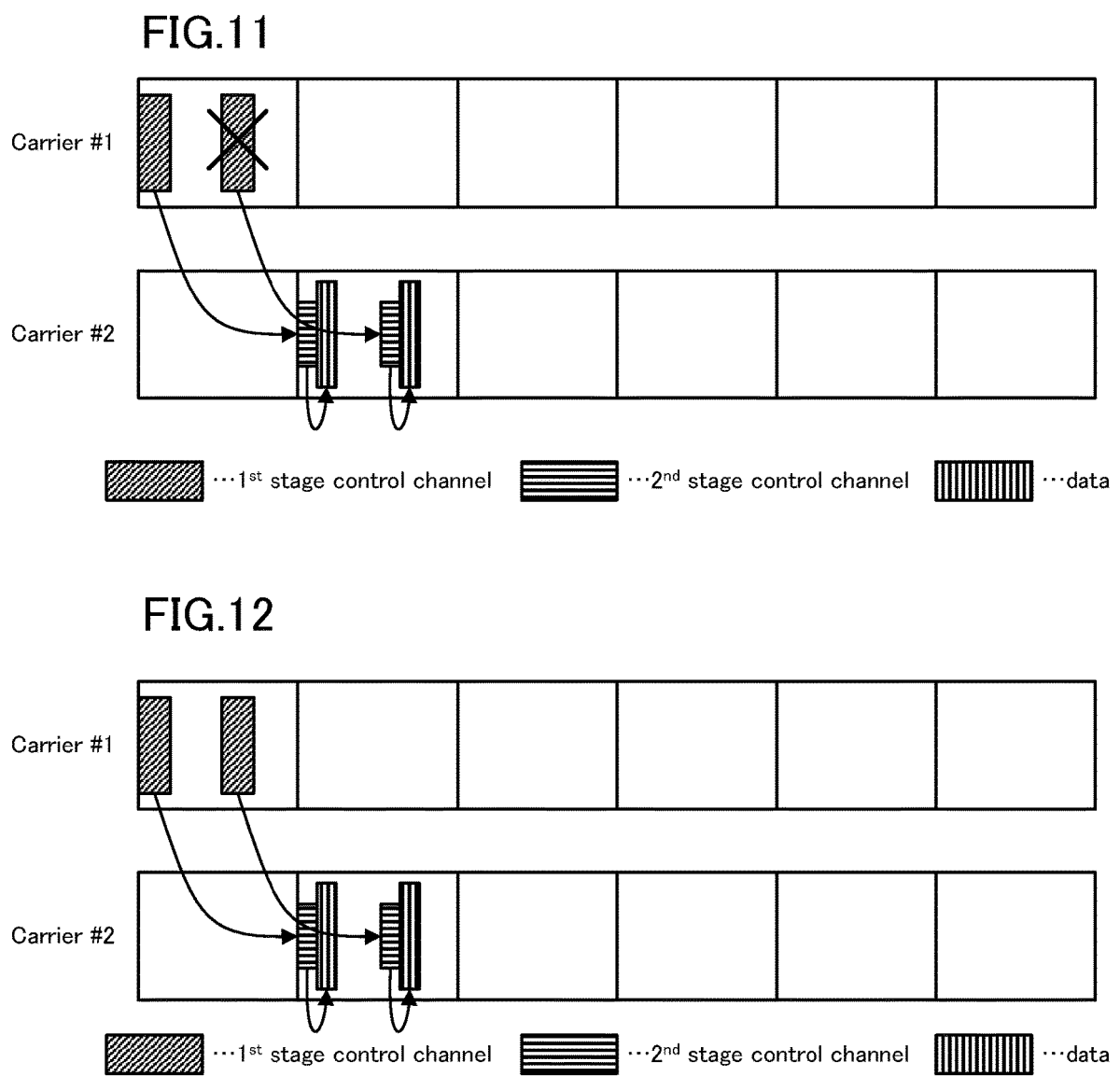

Carrier #1

Carrier #2

▨▨▨ ···1ˢᵗ stage control channel    ▤▤▤ ···2ⁿᵈ stage control channel    ||||||| ···data

FIG.12

Carrier #1

Carrier #2

▨▨▨ ···1ˢᵗ stage control channel    ▤▤▤ ···2ⁿᵈ stage control channel    ||||||| ···data Carrier #1

Carrier #2

▨ ···1ˢᵗ stage control channel     ▤ ···2ⁿᵈ stage control channel     ▥ ···data

Carrier #1

Carrier #2

▨ ···1ˢᵗ stage control channel     ▤ ···2ⁿᵈ stage control channel     ▥ ···data

FIG.18

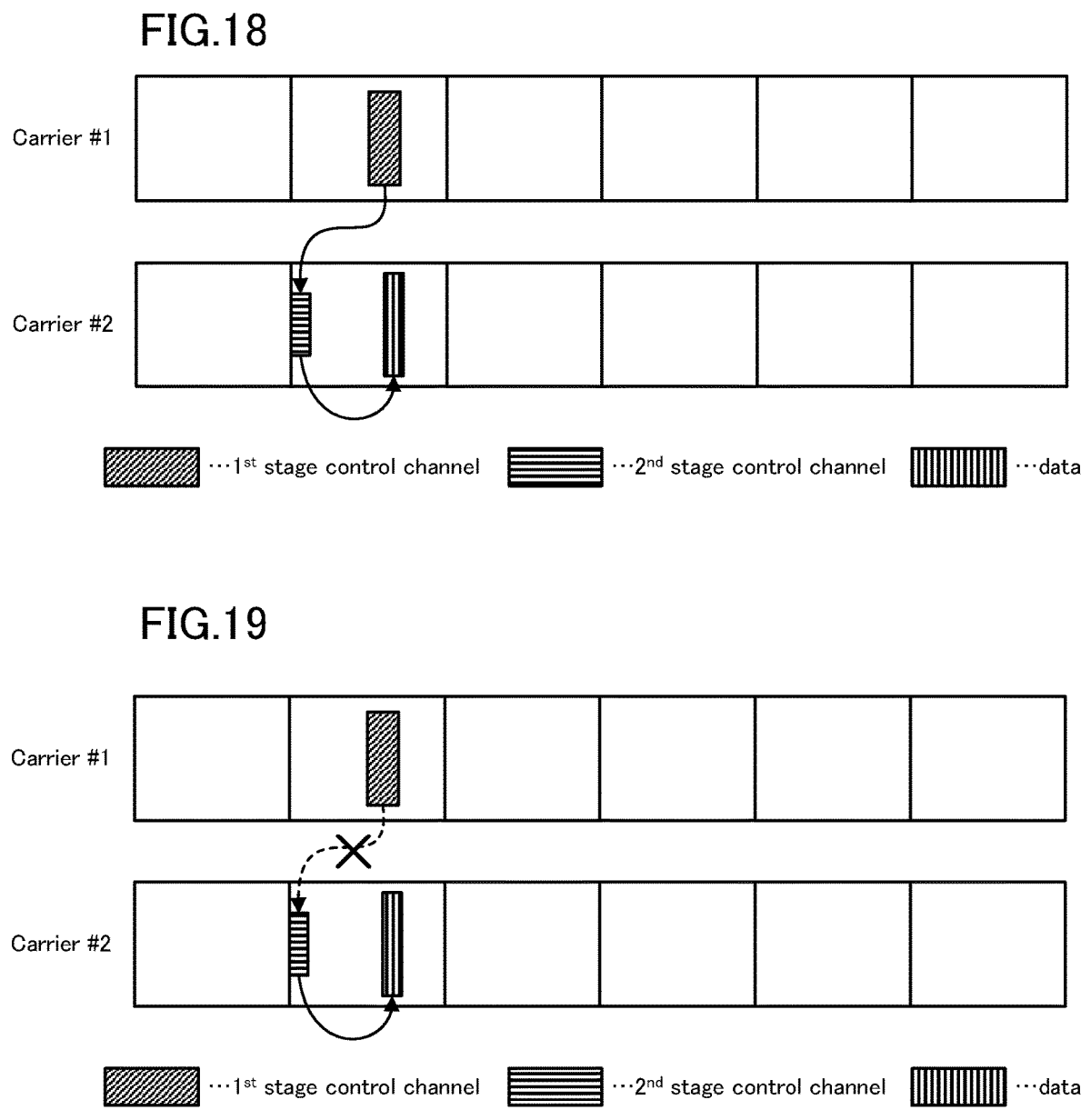

Carrier #1

Carrier #2

▨ ···1st stage control channel    ▤ ···2nd stage control channel    ▥ ···data

FIG.19

Carrier #1

Carrier #2

▨ ···1st stage control channel    ▤ ···2nd stage control channel    ▥ ···data

Carrier #1

Carrier #2

▨▨▨ ···1ˢᵗ stage control channel    ▤▤▤ ···2ⁿᵈ stage control channel    ▥▥▥ ···data Carrier #1

Carrier #2

▨▨▨ ···1ˢᵗ stage control channel    ▤▤▤ ···2ⁿᵈ stage control channel    ▥▥▥ ···data Carrier #1

Carrier #2

▨ ···1ˢᵗ stage control channel   ▤ ···2ⁿᵈ stage control channel   ▥ ···data

Carrier #1

Carrier #2

▨ ···1ˢᵗ stage control channel   ▤ ···2ⁿᵈ stage control channel   ▥ ···data

Carrier #1

Carrier #2

▨▨▨···1st stage control channel  ☰☰☰···2nd stage control channel  |||||||···data Carrier #1

Carrier #2

▨▨▨···1st stage control channel  ☰☰☰···2nd stage control channel  |||||||···data

TERMINAL, BASE STATION, AND RADIO COMMUNICATION METHOD

TECHNICAL FIELD

The present disclosure relates to a terminal, a base station, and a radio communication method for executing radio communication, and more particularly, to a terminal, a base station, and a radio communication method corresponding to cross-carrier scheduling.

BACKGROUND ART

The 3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Release 15 and Release 16 (NR) of the 3 GPP specify operation in a band that includes multiple frequency ranges, specifically, FR 1 (410 MHz to 7.125 GHz) and FR 2 (24.25 GHz to 52.6 GHz).

NR beyond 52.6 GHz to 71 GHz is also under consideration (Non-Patent Literature 1). In addition, Beyond 5G, 5G Evolution, or 6 G (Release-18 and later) aims to support frequencies above 71 GHz.

CITATION LIST

Non-Patent Literature

Non-Patent Literature 1 "New WID on Extending current NR operation to 71 GHz", RP-193229, 3 GPP TSG RAN Meeting #86, 3 GPP, December 2019

SUMMARY OF INVENTION

When a frequency band different from that of the FR1 and FR2, such as a high frequency band exceeding 52.6 GHz, is used, a large (wide) subcarrier interval (SCS) is assumed to be applied in order to support stable radio communication when a terminal (User Equipment, UE) moves at a high speed, thereby shortening the symbol time.

In a carrier to which a large SCS is applied, channel estimation (CE) of a control channel (For example, PDCCH (Physical Downlink Control Channel)) is limited, so that the number of CCEs (s) (Control Channel Element (s)) that can be assigned to the control channel is reduced.

In order to solve such a problem, cross-carrier scheduling using two or more carriers can be considered, but the inventors have found, as a result of careful examination, that the number of schedulable data decreases due to the difference in symbol times of two or more carriers.

Accordingly, the following disclosure has been made in view of such a situation, and it is an object of the present invention to provide a terminal, a base station, and a radio communication method capable of appropriately coping with cross-carrier scheduling.

An aspect of the present disclosure is a terminal comprising: a reception unit that receives a first control information by a first control channel on a first carrier and a second control information by a second control channel on a second carrier; and a control unit that controls a reception of the second control channel based on the first control information, and controls a communication of data based on the second control information.

An aspect of the present disclosure is a base station comprising: a transmission unit that transmits a first control information by a first control channel on a first carrier and a second control information by a second control channel on a second carrier; and a control unit that controls a transmission of the second control information based on the first control information, and controls communication of data based on the second control information.

An aspect of the present disclosure is a radio communication method comprising the steps of: (A) receiving a first control information by a first control channel on a first carrier; and (B) receiving a second control information via a second control channel on a second carrier; wherein the step (A) includes a step of controlling the reception of the second control channel based on the first control information; and the step (B) includes a step of controlling communication of data based on the second control information.

BRIEF DESCRIPTION OF DRAWINGS

FIG. 3 shows an exemplary configuration of a radio frame, subframe, and slot used in a radio communication system 10.

FIG. 4 is a functional block diagram of the UE 200.

FIG. 11 is a diagram for explaining the 2-step control channel indication according to the modification 1.

FIG. 12 is a diagram for explaining the 2-step control channel indication according to the modification 1.

FIG. 18 is a diagram for explaining the 2 step control channel indication according to the modification 6.

FIG. 19 is a diagram for explaining the 2 step control channel indication according to the modification 6.

DESCRIPTIONS OF EMBODIMENTS

Figure 1:
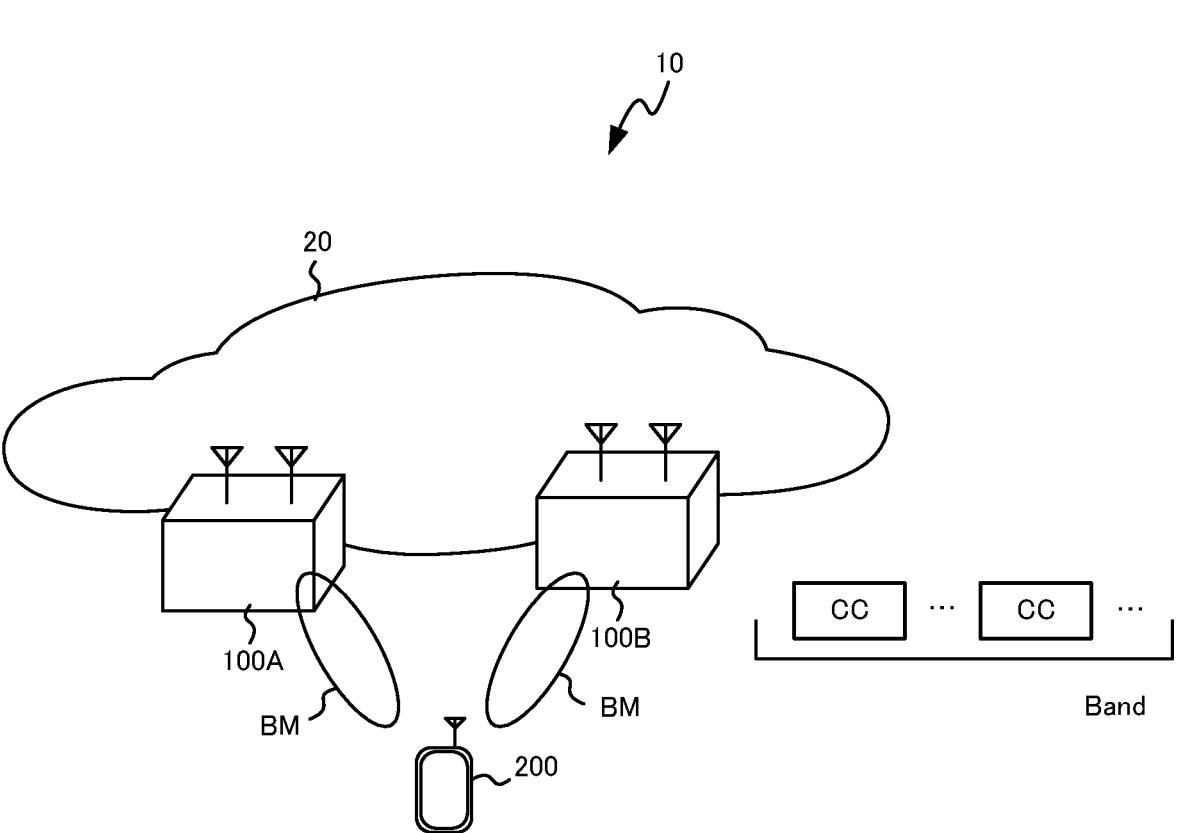
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

Embodiments

(1) Overall Schematic Configuration of the Radio Communication System

FIG. 1 is an overall schematic configuration diagram of a radio communication system 10 according to an embodiment. The radio communication system 10 is a 5G New Radio (NR) compliant radio communication system and includes the Next Generation-Radio Access Network 20 (Hereinafter, UE 200), NG-RAN 20, and terminal 200.

radio communication system 10 may be a radio communication system that follows a scheme called Beyond 5G, 5G Evolution or 6 G.

The NG-RAN 20 includes a radio base station 100 A (gNB 100 A) and a radio base station 100 B (gNB 100 B). The specific configuration of radio communication system 10 including the number of gNBs and UEs is not limited to the example shown in FIG. 1.

The NG-RAN 20 actually includes a plurality of NG-RAN Nodes, specifically gNBs (or ng-eNBs), and is connected to a core network (5GC, not shown) according to 5G. Note that the NG-RAN 20 and 5 GC may be expressed simply as a "network".

Figure 2:
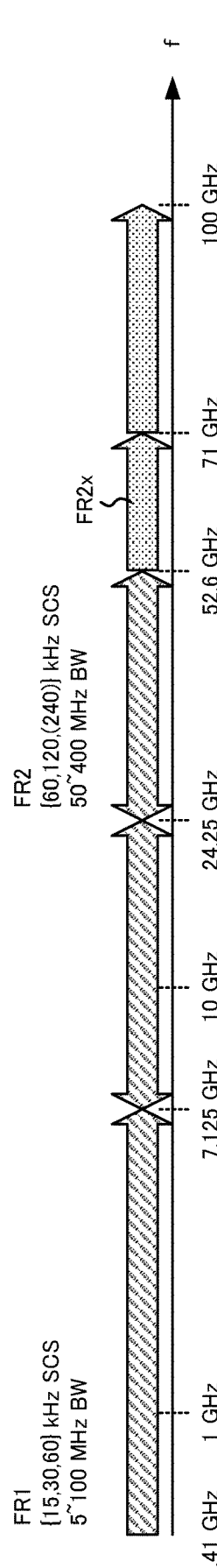
FIG. 2 is a diagram illustrating the frequency range used in radio communication system 10.

The gNB 100 A and the gNB 100 B are radio base stations according to 5G, and execute radio communication according to the UE 200 and 5G. By controlling radio signals transmitted from a plurality of antenna elements, the gNB 100 A, the gNB 100 B, and the UE 200 can support Massive MIMO (Multiple-Input Multiple-Output) for generating a beam BM having a higher directivity, carrier aggregation (CA) for bundling a plurality of component carriers (CC), and dual connectivity (DC) for communicating with two or more transport blocks simultaneously between the UE and each of the two NG-RAN Nodes.

radio communication system 10 corresponds to a plurality of frequency ranges (FR). FIG. 2 shows the frequency range used in radio communication system 10.

As shown in FIG. 2, the radio communication system 10 corresponds to FR1 and FR2. The frequency bands of each FR are as follows.

FR 1: 410 MHz~7.125 GHz FR 2: 24.25 GHz to 52.6 GHz In FR 1, 15, 30 or 60 kHz Sub-Carrier Spacing (SCS) may be used and a 5~100 MHz bandwidth (BW) may be used. FR 2 is a higher frequency than FR 1, and an SCS of 60 or 120 kHz (240 kHz may be included) may be used, and a bandwidth (BW) of 50~400 MHz may be used.

The SCS may be interpreted as numerology. Numerology is defined in 3 GPP TS 38.300 and corresponds to one subcarrier interval in the frequency domain.

Furthermore, the radio communication system 10 also supports higher frequency bands than the FR 2 frequency band. Specifically, the radio communication system 10 supports the frequency band above 52.6 GHz up to 114.25 GHz. Such a high frequency band may be referred to as "FR2x" for convenience.

In order to solve such a problem, cyclic prefix-orthogonal frequency division multiplexing (CP-OFDM)/discrete Fourier transform-spread (DFT-S-OFDM) with larger sub-carrier spacing (SCS) may be applied when using a band above 52.6 GHz.

Figure 3:
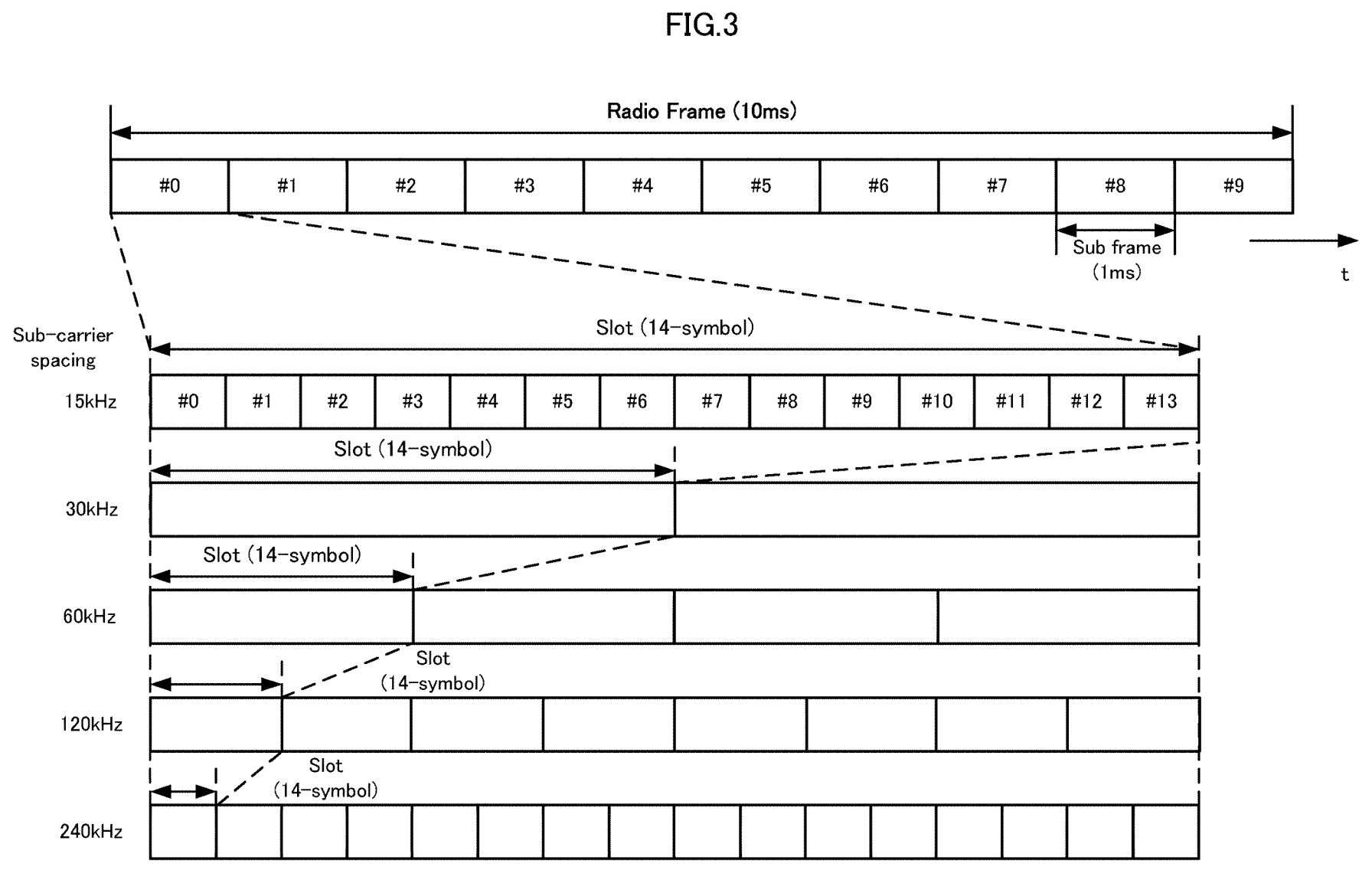

FIG. 3 shows a configuration example of a radio frame, a sub-frame and a slot used in radio communication system 10.

As shown in FIG. 3, one slot comprises 14 symbols, and the larger (wider) the SCS, the shorter the symbol period (and the slot period). The SCS is not limited to the spacing (frequency) shown in FIG. 3. For example, 480 kHz, 960 kHz, and the like may be used.

The number of symbols constituting 1 slot is not necessarily 14 (For example, 28, 56 symbols). Furthermore, the number of slots per subframe may vary depending on the SCS.

The time direction (t) shown in FIG. 3 may be referred to as a time region, a symbol period or a symbol time. The frequency direction may be referred to as a frequency domain, a resource block, a subcarrier, a bandwidth part (BWP), or the like.

The DMRS is a type of reference signal and is prepared for various channels. Unless otherwise specified, the DMRS for the downlink data channel, specifically the PDSCH (Physical Downlink Shared Channel) may be used herein. However, the upstream data channel, specifically the DMRS for PUSCH (Physical Uplink Shared Channel) may be interpreted as the same as the DMRS for PDSCH.

The DMRS may be used for channel estimation in the UE 200 as part of a device, e.g., coherent demodulation. The DMRS may only be present in the resource block (RB) used for PDSCH transmission.

The DMRS may have multiple mapping types. Specifically, the DMRS has a mapping type A and a mapping type B. In mapping type A, the first DMRS is placed on the second or third symbol of the slot. In mapping type A, the DMRS may be mapped relative to slot boundaries, regardless of where in the slot the actual data transmission begins. The reason that the first DMRS is placed at the second or third symbol of the slot may be interpreted as placing the first DMRS after the control resource sets (CORESET).

In mapping type B, the first DMRS may be located at the first symbol of the data allocation. That is, the position of the DMRS may be given relative to where the data is located, rather than relative to the slot boundaries.

The DMRS may have a plurality of types. Specifically, the DMRS has Type 1 and Type 2. Type 1 and Type 2 differ in the maximum number of mapping and orthogonal reference signals in the frequency domain. Type 1 can output up to four orthogonal signals with single-symbol DMRS, and Type 2 can output up to eight orthogonal signals with double-symbol DMRS.

(2) Function Block Configuration of Radio Communication System

Next, the functional block configuration of radio communication system 10 will be described.

First, the functional block configuration of the UE 200 will be described.

Figure 4:
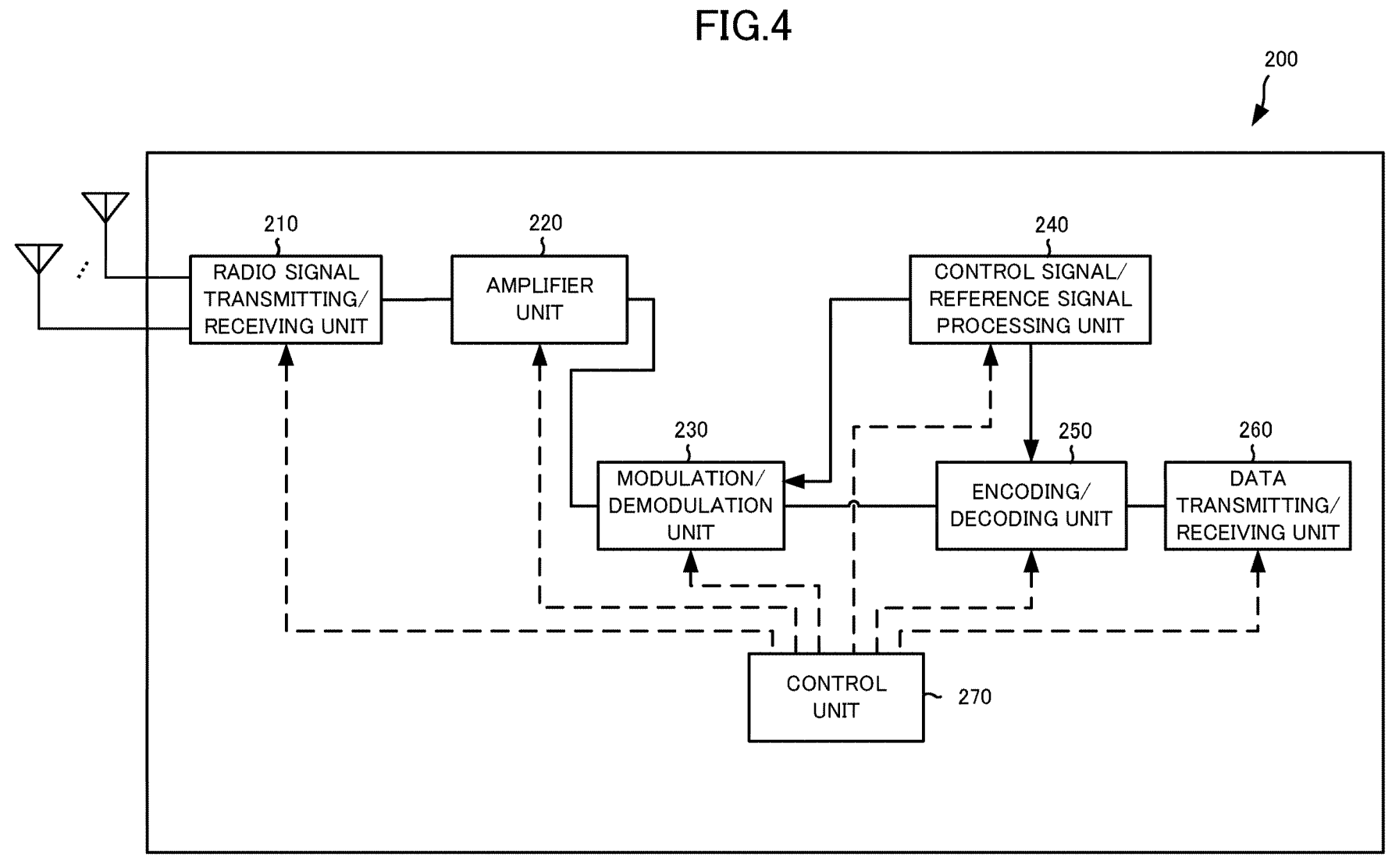

FIG. 4 is a functional block diagram of the UE 200. As shown in FIG. 4, the UE 200 includes a radio signal transmission/reception unit 210, an amplifier unit 220, a modulation/demodulation unit 230, a control signal/reference signal processing unit 240, an encoding/decoding unit 250, a data transmission/reception unit 260 and a control unit 270.

radio signal transmission/reception unit 210 transmits and receives radio signals in accordance with NR. The radio signal transmission/reception unit 210 supports Massive MIMO, CA with multiple CCs bundled together, and DC with simultaneous communication between the UE and each of the 2 NG-RAN Nodes.

In the embodiment, radio signal transmission/reception unit 210 constitutes a reception unit for receiving first control information by a first control channel on a first carrier and receiving second control information by a second control channel on a second carrier.

The SCS applied to the second carrier may be larger than the SCS applied to the first carrier. The first control channel may be referred to as the first PDCCH and the second control channel may be referred to as the second PDCCH. The first control information may be referred to as the first DCI, and the second control information may be referred to as the second DCI.

amplifier unit 220 is composed of a PA (Power Amplifier)/ LNA (Low Noise Amplifier) and the like. The amplifier unit 220 amplifies the signal output from modulation/demodulation unit 230 to a predetermined power level. The amplifier unit 220 also amplifies the RF signal output from radio signal transmission/reception unit 210.

The modulation/demodulation unit 230 performs data modulation/demodulation, transmission power setting, resource block allocation and the like for each predetermined communication destination (gNB 100 or other gNB). In modulation/demodulation unit 230, Cyclic Prefix-Orthogonal Frequency Division Multiplexing (CP-OFDM)/ Discrete Fourier Transform-Spread (DFT-S-OFDM) may be applied. The DFT-S-OFDM may be used not only in the uplink (UL) but also in the downlink (DL).

The control signal/reference signal processing unit 240 executes processing relating to various control signals transmitted and received by the UE 200 and processing relating to various reference signals transmitted and received by the UE 200.

Specifically, the control signal/reference signal processing unit 240 receives various control signals transmitted from the gNB 100 via a predetermined control channel, for example, a control signal of the radio resource control layer (RRC). The control signal/reference signal processing unit 240 transmits various control signals to the gNB 100 through a predetermined control channel.

The control signal/reference signal processing unit 240 performs processing using reference signals (RS) such as the Demodulation Reference Signal (DMRS) and the Phase Tracking Reference Signal (PTRS).

The DMRS is a reference signal (pilot signal) known between a base station and a terminal of each terminal for estimating a fading channel used for data demodulation. The PTRS is a reference signal for each terminal for the purpose of estimating phase noise which becomes a problem in a high frequency band.

In addition to DMRS and PTRS, the reference signal may include a Channel State Information-Reference Signal (CSI-RS), a Sounding Reference Signal (SRS), and a Positioning Reference Signal (PRS) for position information.

The channel includes a control channel and a data channel. The control channel includes PDCCH (Physical Downlink Control Channel), PUCCH (Physical Uplink Control Channel), RACH (Random Access Channel), Downlink Control Information (DCI) including a Random Access Radio Network Temporary Identifier (RA-RNTI), and a Physical Broadcast Channel (PBCH).

The data channels include PDSCH (Physical Downlink Shared Channel) and PUSCH (Physical Uplink Shared Channel). Data means data transmitted over a data channel. The data channel may be read as a shared channel.

Here, the control signal/reference signal processing unit 240 constitutes a reception unit for receiving the downlink control information (DCI). DCI includes fields that store existing fields such as DCI Formats, Carrier Indicator (CI), BWP Indicator, FDRA (Frequency Domain Resource Allocation), TDRA (Time Domain Resource Allocation), MCS (Modulation and Coding Scheme), HPN (HARQ Process Number), NDI (New Data Indicator), and RV (Redundancy Version).

The value stored in the DCI Format field is an information element that specifies the format of the DCI. The value stored in the CI field is an information element that specifies the CC to which the DCI applies. The value stored in the BWP indicator field is an information element that specifies the BWP to which the DCI applies. The BWP that can be specified by the BWP indicator is set by the information element (BandwidthPart-Config) contained in the RRC message. The value stored in the FDRA field is an information element that specifies the frequency domain resource to which the DCI applies. The frequency domain resource is specified by a value stored in the FDRA field and an information element (RA Type) contained in the RRC message. The value stored in the TDRA field is an information element that specifies the time domain resource to which the DCI applies. The time domain resource is specified by a value stored in the TDRA field and an information element (pdsch-TimeDomainAllocationList, pusch-TimeDomainAllocationList) contained in the RRC message. The time domain resource may be specified by a value stored in the TDRA field and a default table. The value stored in the MCS field is an information element that specifies the MCS to which the DCI applies. The MCS is specified by the values stored in the MCS and the MCS table. The MCS table may be specified by an RRC message or specified by RNTI scrambling. The value stored in the HPN field is an information element that specifies the HARQ Process to which the DCI applies. The value stored in the NDI is an information element for specifying whether or not the data to which the DCI is applied is the first transmission data. The value stored in the RV field is an information element that specifies the redundancy of the data to which the DCI applies.

In an embodiment, the DCI includes a time domain resource allocation (TDRA) of an uplink channel (PUSCH). The DCI including the TDRA of the PUSCH may be a DCI of Format 0_0, Format 0_1 or Format 0_2.

The encoding/decoding unit 250 executes data division/ connection, channel coding/decoding and the like for each predetermined communication destination (gNB 100 or other gNB).

Specifically, the encoding/decoding unit 250 divides the data output from data transmission/reception unit 260 into predetermined sizes, and executes channel coding on the divided data. The encoding/decoding unit 250 decodes the data output from modulation/demodulation unit 230 and connects the decoded data.

The data transmission/reception unit 260 sends and receives protocol data units (PDU) and service data units (SDU). Specifically, data transmission/reception unit 260 performs assembly/disassembly of PDUs/SDUs in a plurality of layers (Media access control layer (MAC), radio link control layer (RLC), and packet data convergence protocol layer (PDCP), etc.). The data transmission/reception unit 260 executes error correction and retransmission control of the data based on the hybrid automatic repeat request (HARQ).

The control unit 270 controls each functional block constituting the UE 200. For example, in the embodiment, the control unit 270 configures a control unit that controls reception of the second control channel based on the first control information and controls communication of data based on the second control information.

Communication of data may be performed via a channel on the second carrier. Communication of data may be performed via a channel on a third carrier different from the second carrier. The data may be DL data or UL data. Thus, data communication may be performed via PDSCH or via PUSCH.

Next, the functional block configuration of the gNB 100 will be described.

Figure 5:
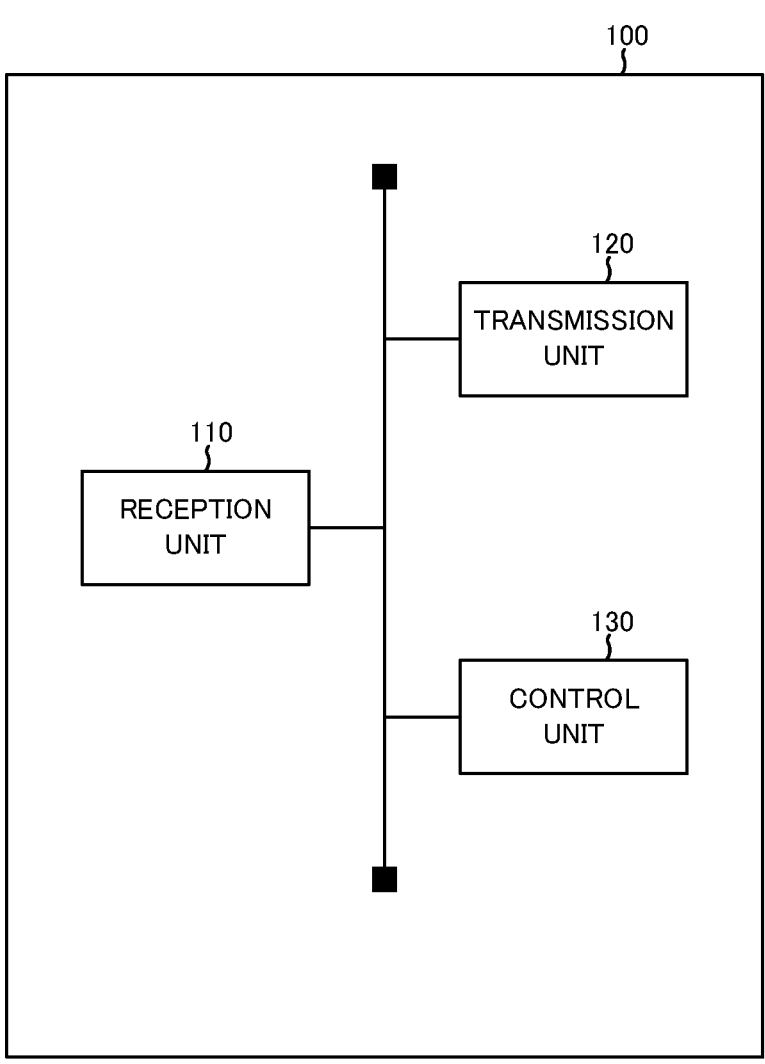
FIG. 5 is a functional block diagram of the gNB 100.

FIG. 5 is a functional block diagram of the gNB 100. As shown in FIG. 5, the gNB 100 has a reception unit 110, a transmission unit 120 and a control unit 130.

The reception unit 110 receives various signals from the UE 200. The reception unit 110 may receive the UL signal via PUCCH or PUSCH.

The transmission unit 120 transmits various signals to the UE 200. The transmission unit 120 may transmit a DL signal over PDCCH or PDSCH. In the embodiment, the transmission unit 120 constitutes a transmission unit for transmitting first control information through a first control channel on a first carrier and transmitting second control information through a second control channel on a second carrier.

The control unit 130 controls the gNB 100. In the embodiment, the control unit 130 configures a control unit that controls transmission of the second control information based on the first control information and controls communication of data based on the second control information.

(3) Application Examples

An application example will be described below. Here, cross-carrier scheduling will be mainly described.

Figure 6:
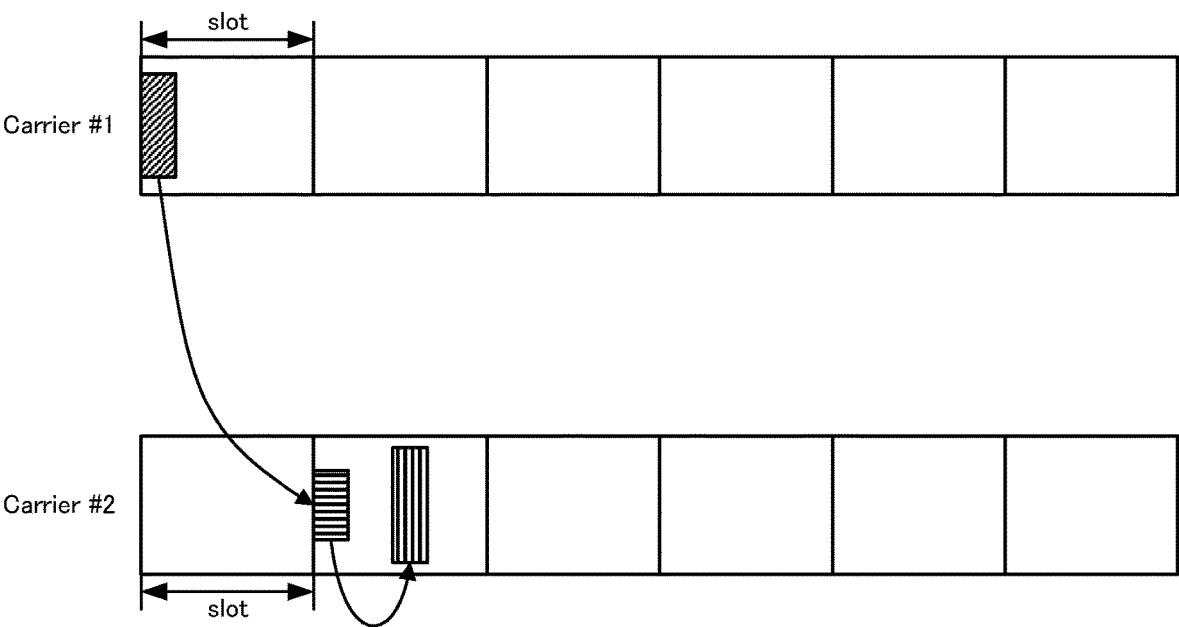
FIG. 6 is a diagram for illustrating two-step control channel indication.
Figure 6:
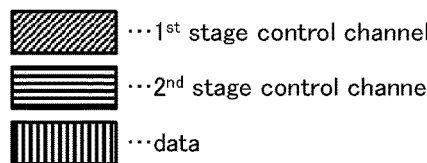

As shown in FIG. 6, in cross-carrier scheduling, the second control information transmitted by the second control channel ($2^{nd}$ stage control channel) on the second carrier (Hereinafter is Carrier #1) is scheduled based on the first control information transmitted by the first control channel ($1^{st}$ stage control channel) on the first carrier (Hereinafter is Carrier #2), and data is scheduled based on the second control information. Such scheduling may be referred to as two-step control channel indication.

FIG. 6 merely illustrates a case in which the slot length of the carrier #1 is the same as the slot length of the carrier #2 for simplification of the description. In practice, the SCS applied to the carrier #2 may be larger than the SCS applied to the carrier #1, and the slot length of the carrier #2 may be shorter than the slot length of the carrier #1. The carriers #1 and #2 may be carriers belonging to the FR2x described above. Alternatively, the carrier #1 may be a carrier belonging to the above-mentioned FR1 or FR2, and the carrier #2 may be a carrier belonging to FR2x.

(3.1) $2^{nd}$ Stage Control Channel Time Domain Resources

First, the first control information may include an information element that specifies the start point and length of the time domain resource of the $2^{nd}$ stage control channel. The starting point and length may be specified in symbol units, slot units, subframe units, or frame units.

Second, the first control information may include an information element that specifies all lower time units included in the higher time units. For example, the first control information may include an information element that specifies all symbols included in slot, an information element that specifies all slots (or symbols) included in subframe, and an information element that specifies all subframes (slots or symbols) included in frame.

Third, the time domain resource of the $2^{nd}$ stage control channel may be set by a higher layer. The higher layer may be an RRC layer. In such a case, the following options are considered.

In option 1, the configured time domain resource may always be available.

In option 2, the set time domain resource may be enabled only once by the $1^{st}$ stage control channel.

In option 3, the configured time domain resource may be enabled over a specific time interval. The specific time interval may be a symbol of N1, a slot of N1, a subframe of N1, or a frame of N1. N1 is an integer of 1 or more, may be specified by a $1^{st}$ stage control channel (first control information), may be set by a higher layer, or may be predetermined.

In option 3, a mechanism for invalidating a set time domain resource may be introduced. The expiration time of a specific time interval may be defined by N2. N2 is an integer greater than or equal to 1 and may be defined in units of symbol, slot, subframe, or frame. N2 is an integer of 1 or more, may be specified by a $1^{st}$ stage control channel (first control information), may be set by a higher layer, or may be predetermined. N2 may be smaller than N1, larger than N1, or the same as N1. The time unit defining N2 (symbol, slot, subframe, frame) may be different from the time unit defining N1 (symbol, slot, subframe, frame).

The invalidation of the time domain resource may be introduced by $1^{st}$ stage control channel (first control information) including one or more specific fields as well as CG (Configured Grant) and SPS (Semi-Persistent Scheduling).

The method of specifying the time domain resource described above may be switched according to a combination of two or more elements selected from the configuration of the higher layer, the $1^{st}$ stage control channel and other control channels. The other control channel may be a control channel for each UE 200 or a group common control channel for a group of UE 200.

(3.2) $2^{nd}$ Stage Control Channel Frequency Domain Resources

First, the first control information may include an information element that specifies the start point and length of the frequency domain resource of the $2^{nd}$ stage control channel. The starting point and length may be specified in units of RE (Resource Element), RB, BWP, or CC. The frequency unit (RE, RB, BWP, CC) switching may be switched by the NR FDRA Type (Type 1, Type 2).

Second, the first control information may include an information element (For example, a 1-bit flag) that indicates whether all resources contained in the frequency unit (RB, BWP, CC) are available to the $2^{nd}$ stage control channel. All such resource allocations or other resource allocations (Type 1, Type 2) may be dynamically switched by the control channel or may be set by a higher layer on semi-static (semi-static).

Third, the frequency domain resource of the $2^{nd}$ stage control channel may be set by a higher layer. The higher layer may be an RRC layer. In such a case, the following options are considered.

In option 1, the set frequency domain resources may always be fixed.

In option 2, the resources actually used for the $2^{nd}$ stage control channel may be shifted by a set pair of frequency domain resources and offset values. Such a resource shift may be performed on an hourly basis or on an $2^{nd}$ stage control channel basis.

The frequency domain resource specification method described above may be switched according to a combination of two or more elements selected from the higher layer configuration, the $1^{st}$ stage control channel, and other control channels. The other control channel may be a control channel for each UE 200 or a group common control channel for a group of UE 200.

(3.3) Aggregation Level (AL) for $2^{nd}$ Stage Control Channel

The first control information may designate one AL (For example, AL=16) as the AL of the $2^{nd}$ stage control channel. The first control information may designate two or more ALs (For example, AL=8 or AL=16) as ALs of the $2^{nd}$ stage control channel. The number of ALs that can be specified may be set by the higher layer or may be predetermined.

In such a case, the UE 200 may specify the format of the $2^{nd}$ stage control channel by the BD (Blind Decoding) of the $2^{nd}$ stage control channel.

Note that the UE 200 may also specify the AL of the $2^{nd}$ stage control channel by the BD (Blind Decoding) of the $2^{nd}$ stage control channel.

(3.4) $2^{nd}$ Stage Control Channel Format

The first control information may designate one format (For example, DCI format 1_1) as the format of the $2^{nd}$ stage control channel. The first control information may designate two or more formats (For example, DCI format 1_1 or DCI format 1_2) as the format of the $2^{nd}$ stage control channel. The number of formats that can be specified may be set by the higher layer or may be predetermined. The format of the $2^{nd}$ stage control channel may be DCI format formats 1_0, 1_1, 1_2, 0_0, 0_1, 0_2. The format of the $2^{nd}$ stage control channel may be a newly defined format.

In such a case, the UE 200 may specify the AL of the $2^{nd}$ stage control channel by the BD (Blind Decoding) of the $2^{nd}$ stage control channel.

Note that the format of the $2^{nd}$ stage control channel may also be specified by the BD (Blind Decoding) of the $2^{nd}$ stage control channel in the UE 200.

(3.5) $2^{nd}$ Stage Control Channel Resources

The resources of the $2^{nd}$ stage control channel may be specified by the $1^{st}$ stage control channel (first control information) from among the resources set by the higher layer, similarly to the mechanism for specifying the PUCCH resource.

The resources in the $2^{nd}$ stage control channel may be mapped one-to-one with the resources in the $1^{st}$ stage control channel. The mapping may be set by a higher layer or specified by a predetermined formula. In such a case, the format of the $1^{st}$ stage control channel may be DCI format formats 1_0, 1_1, 1_2, 0_0, 0_1, 0_2. 1 The format of the $1^{st}$ stage control channel may be a newly defined format.

(3.6) $2^{nd}$ Stage Control Channel Fields

The $1^{st}$ stage control channel (first control information) may designate a field value included in the $2^{nd}$ stage control channel (second control information). The fields designated by the first control information may be BWP ID, CC ID, modulation order (For example, the MCS index), RV, frequency hopping, priority indicator, power control (TPC command), and the like. The BWP or CC specified by the first control information may be activated after notification of the power saving or may be activated at any time.

(3.7) Data Resources

The second control information specifies the time domain resource of the data.

First, the second control information may specify the time domain resource of the data using the existing TDRA.

Second, the second control information may include an information element that specifies all lower time units included in the higher time units. For example, the second control information may include an information element that specifies all symbols included in slot, an information element that specifies all slots (or symbols) included in subframe, and an information element that specifies all subframes (slots or symbols) included in frame.

The second control information specifies the frequency domain resource of the data.

First, the second control information may specify the time domain resource of the data using an existing FDRA.

Second, the second control information may include an information element (For example, a 1-bit flag) indicating whether all resources contained in the frequency unit (RB, BWP, CC) are available for data.

(3.8) Summary

As described above, the control unit 270 of the UE 200 may specify at least one of the time domain resource and the frequency domain resource of the $2^{nd}$ stage control channel based on the first control information. The control unit 270 of the UE 200 may specify at least one of the time domain resource and the frequency domain resource of the $2^{nd}$ stage control channel based on the configuration of the higher layer. The control unit 270 of the UE 200 may specify at least one of the time domain resource and the frequency domain resource of the $2^{nd}$ stage control channel based on the first control information and the configuration of the higher layer.

The first control information may include an information element for specifying at least one of the number of control channel elements (CCE (s)) that can be assigned to the $2^{nd}$ stage control channel and the $2^{nd}$ stage control channel. The number of CCE (s) that can be assigned to the $2^{nd}$ stage control channel may be equivalent to AL as described above.

(4) Operation Example

An operation example will be described below. Here, cross-carrier scheduling will be mainly described. In cross-carrier scheduling, the two-step control channel indication described above is applied.

Figure 7:
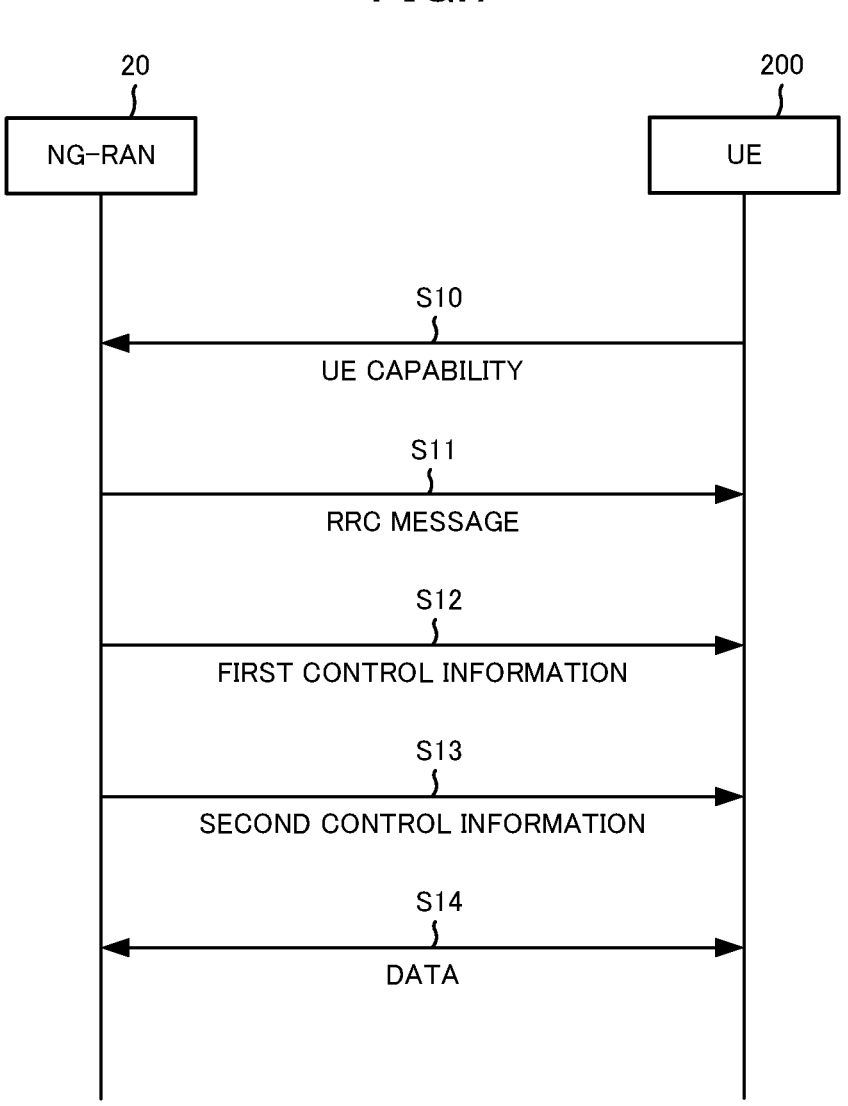
FIG. 7 is a sequence diagram showing an example of operation.

As shown in FIG. 7, in step 10, the UE 200 transmits the UE capability to the NG-RAN 20. The UE capability may include an information element indicating the capability of the UE 200 for 2 step control channel indication. For example, the UE capability may include an information element indicating whether the UE 200 supports the 2 step control channel indication.

In step 11, the NG-RAN 20 transmits an RRC message to the UE 200. The RRC message may include an information element indicating a configuration for two-step control channel indication. Such a configuration is an example of the above-described configuration of the higher layer.

In step 12, the NG-RAN 20 transmits the first control information to the UE 200 via the 1$^{st}$ stage control channel on the carrier #1. The UE 200 receives the first control information and specifies a resource of the 2$^{nd}$ stage control channel or the like on the basis of the first control information.

In step 13, the NG-RAN 20 transmits the second control information to the UE 200 via the 2$^{nd}$ stage control channel on the carrier #2. The NG-RAN 20 controls the transmission of the second control information based on the first control information. The UE 200 receives the second control information and specifies a data resource or the like on the basis of the second control information.

In step 14, the UE 200 and the NG-RAN 20 execute (control) data communication based on the second control information. The data may be DL data or UL data.

(5) Function and Effects

In an embodiment, the UE 200 receives the second control information by the 2$^{nd}$ stage control channel on the carrier #2 based on the first control information received by the 1$^{st}$ stage control channel on the carrier #1, and performs data communication based on the received second control information (2 step control channel indication). According to such a configuration, the introduction of the two-step control channel indication allows flexible scheduling of data while reducing constraints on channel estimation including BD. Accordingly, appropriate cross-carrier scheduling can be performed.

Example 1

A first modification of the embodiment will be described below. Hereinafter, differences with respect to the embodiments will be mainly described.

In Modification 1, the control unit 130 of the gNB 100 controls the transmission of the 2$^{nd}$ stage control channel (second control information) so as to satisfy the first application condition. The control unit 270 of the UE 200 controls reception of the 2$^{nd}$ stage control channel (second control information) so as to satisfy the first application condition.

The first application condition may include a condition for individually applying the first control information to the 2$^{nd}$ stage control channel. That is, the first control information is applied to the individual 2$^{nd}$ stage control channels. Application may be read as available or as valid.

The first application condition may include a condition for applying the first control information over a specific time period. The specific time period may be a symbol of N3, a slot of N3, a subframe of N3, or a frame of N3. N3 is an integer of 1 or more, and may be specified by a 1$^{st}$ stage control channel (first control information), may be set by a higher layer, or may be predetermined. Application may be read as available or as valid.

In such a case, a mechanism for invalidating the first control information may be introduced. The expiration time of a specific time interval may be defined by N4. N4 is an integer greater than or equal to 1 and may be defined in units of symbol, slot, subframe, or frame. N4 is an integer of 1 or more, and may be specified by a 1$^{st}$ stage control channel (first control information), may be set by a higher layer, or may be predetermined. N4 may be smaller than N3, larger than N3, or the same as N3. The time unit defining N4 (symbol, slot, subframe, frame) may be different from the time unit defining N3 (symbol, slot, subframe, frame).

The invalidation of the first control information may be introduced by the 1$^{st}$ stage control channel (first control information) including one or more specific fields, similar to CG (Configured Grant) and SPS (Semi-Persistent Scheduling).

The first application condition described above may be switched according to a combination of two or more elements selected from the configuration of the higher layer, the 1$^{st}$ stage control channel (e.g., DCI format in NR), and other control channels. The other control channel may be a control channel for each UE 200 or a group common control channel for a group of UE 200.

Figure 8:
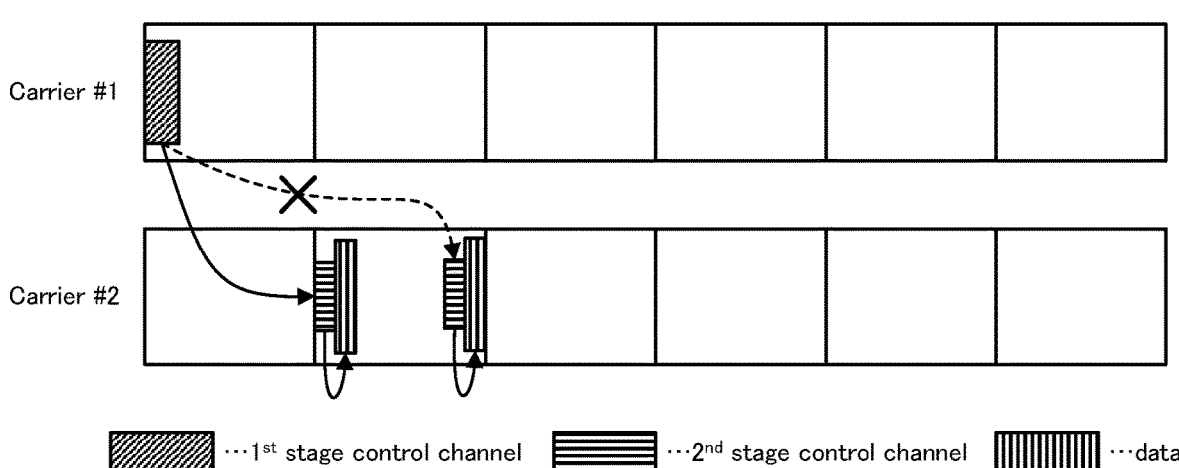
FIG. 8 is a diagram for explaining the two-step control channel indication according to the first modification.

In addition, the first application condition may include the following options:

In option 1, the first application condition may include a condition in which the 1$^{st}$ stage control channel (first control information) is applied to one 2$^{nd}$ stage control channel (second control information), as shown in FIG. 8.

Figure 9:
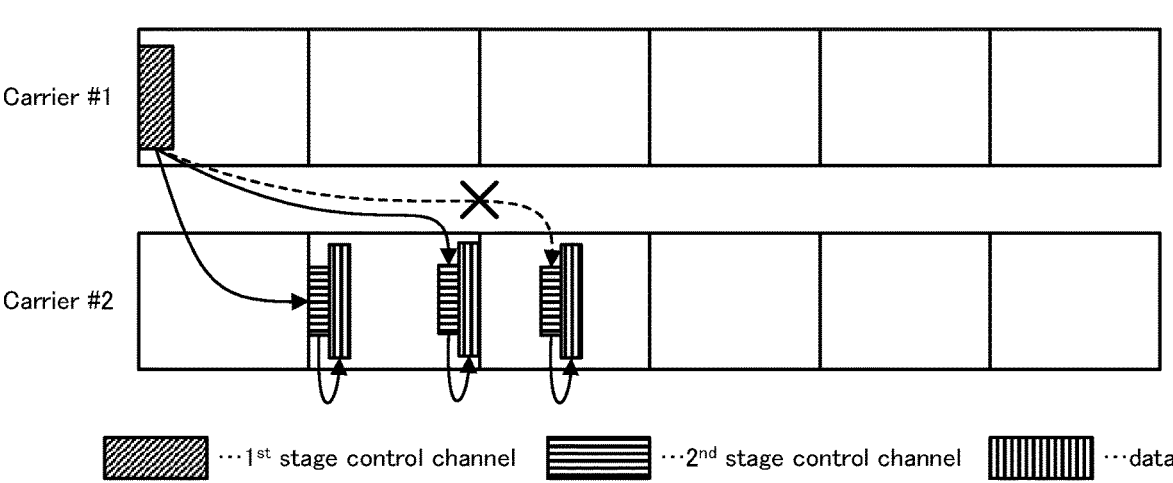
FIG. 9 is a diagram for explaining the two-step control channel indication according to the first modification.

In option 2, the first application condition may include a condition in which the 1$^{st}$ stage control channel (first control information) is applied to two or more 2$^{nd}$ stage control channels (second control information). Such cases may further include the following options:

In option 2-1, the first application condition may include a condition in which 1$^{st}$ stage control channel (first control information) is applied in the same time unit (slot, subframe, frame) as shown in FIG. 9. That is, the first application condition may include a condition that the 1$^{st}$ stage control channel (first control information) is not applied in different time units.

Figure 10:
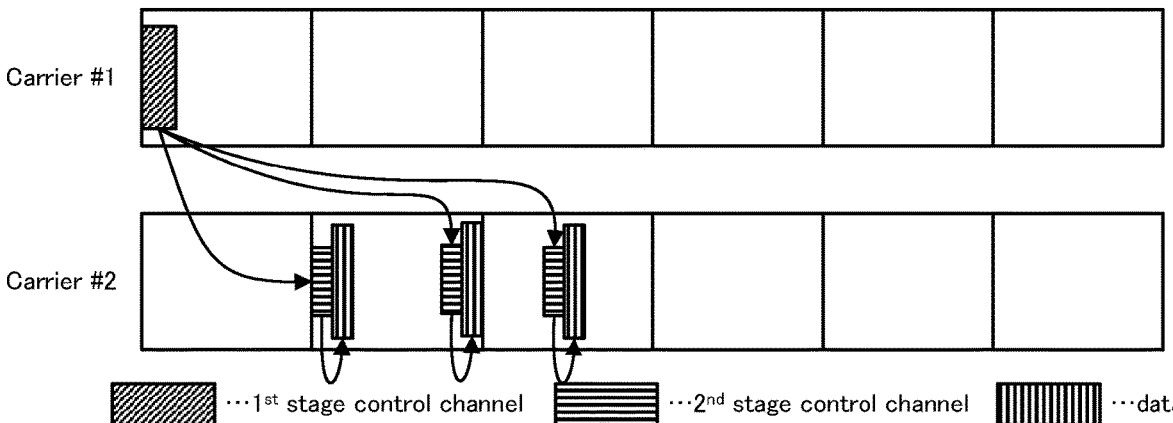
FIG. 10 is a diagram for explaining the 2-step control channel indication according to the modification 1.

In option 2-2, the first application condition may include a condition where 1$^{st}$ stage control channel (first control information) is applied in different time units (slot, subframe, frame), as shown in FIG. 10. That is, the first application condition may not include a time unit limitation.

The options described above may be applied depending on a combination of two or more elements selected from the higher layer configuration, the 1$^{st}$ stage control channel (e.g., DCI format in NR), and other control channels. The other control channel may be a control channel for each UE 200 or a group common control channel for a group of UE 200.

In addition, the first application condition may include the following options:

In option 1, as shown in FIG. 11, the first application condition may include a condition that two or more 1$^{st}$ stage control channels (first control information) are not assumed in the same time unit (slot, subframe, frame).

In option 2, the first application condition may include a condition that two or more 1$^{st}$ stage control channels (first control information) are assumed in the same time unit (slot, subframe, frame), as shown in FIG. 12.

The options described above may be applied depending on a combination of two or more elements selected from the higher layer configuration, the 1$^{st}$ stage control channel (e.g., DCI format in NR), and other control channels. The other control channel may be a control channel for each UE 200 or a group common control channel for a group of UE 200.

In addition, the options described above may be applied based on the UE capability of the UE 200.

Example 2

A second modification of the embodiment will be described below. Hereinafter, differences with respect to the embodiments will be mainly described.

In modification 2, the control unit 130 of the gNB 100 controls data communication so as to satisfy the second application condition. The control unit 270 of the UE 200 controls data communication so as to satisfy the second application condition.

Figure 13:
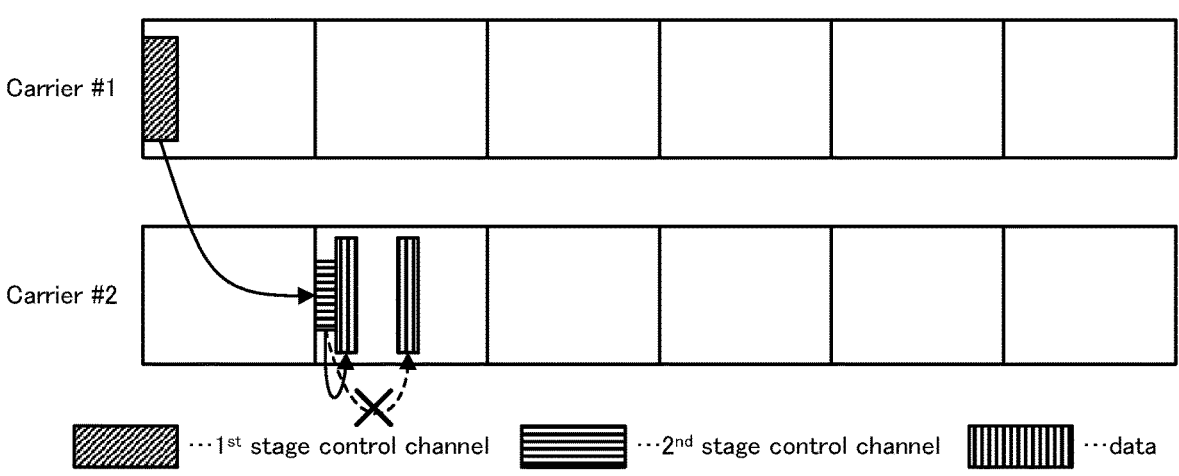
FIG. 13 is a diagram for explaining the 2-step control channel indication according to the modification 2.

The second application condition may include the following options:

In option 1, the second application condition may include a condition in which the $2^{nd}$ stage control channel (second control information) is applied to one piece of data, as shown in FIG. 13.

Figure 14:
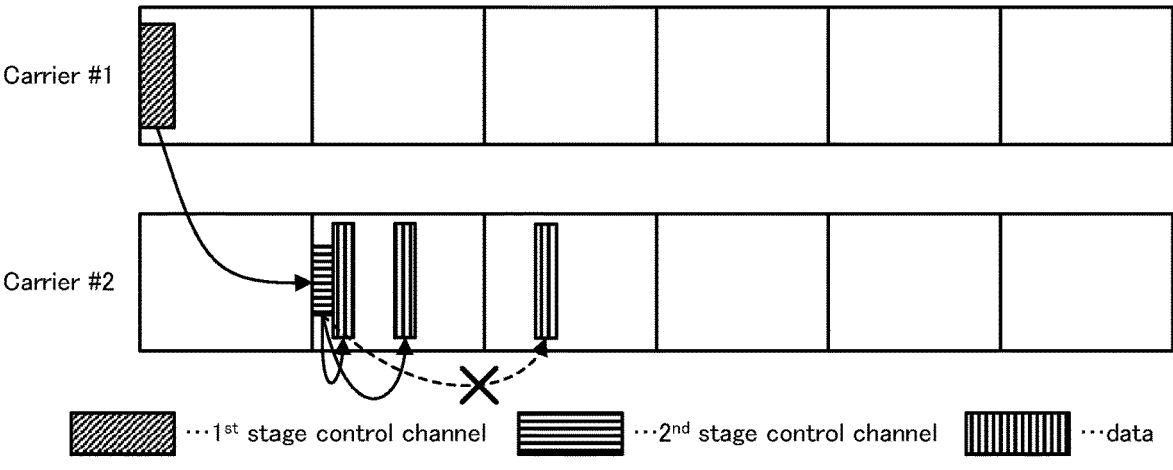
FIG. 14 is a diagram for explaining the 2-step control channel indication according to the modification 2.

In option 2, the second application condition may include a condition under which the $2^{nd}$ stage control channel is applied to two or more pieces of data. Such cases may further include the following options:

In option 2-1, the second application condition may include a condition under which the $2^{nd}$ stage control channel (second control information) is applied in the same time unit (slot, subframe, frame), as shown in FIG. 14. That is, the second application condition may include a condition that the $2^{nd}$ stage control channel (second control information) is not applied in different time units.

Figure 15:
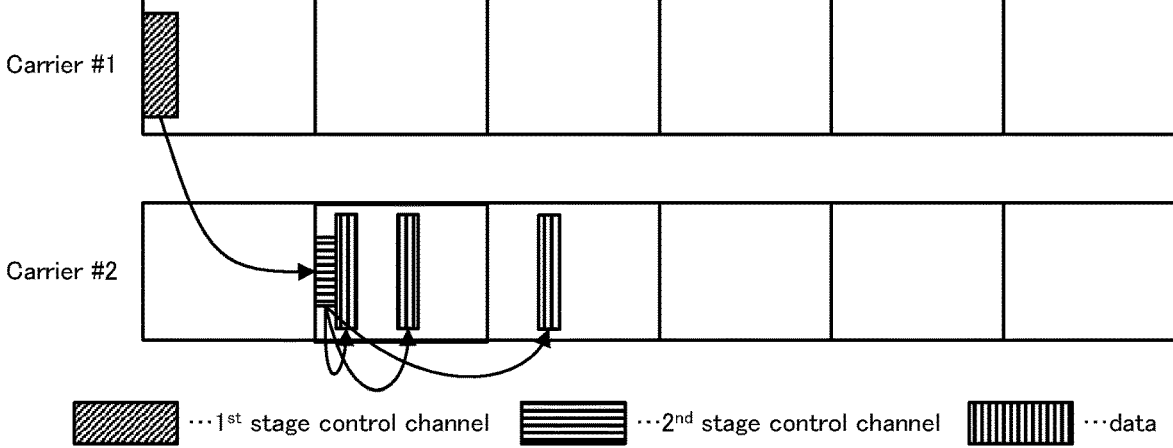
FIG. 15 is a diagram for explaining the 2-step control channel indication according to the modification 2.

In option 2-2, the second application condition may include a condition in which the $2^{nd}$ stage control channel is applied in different time units (slot, subframe, frame), as shown in FIG. 15. That is, the second application condition may not include a time unit limitation.

The options described above may be applied depending on a combination of two or more elements selected from the higher layer configuration, the $2^{nd}$ stage control channel (e.g., DCI format in NR), and other control channels. The other control channel may be a control channel for each UE 200 or a group common control channel for a group of UE 200.

Change Example 3

A third modification of the embodiment will be described below. Hereinafter, differences with respect to the embodiments will be mainly described. In the modification example 3, variations of the first application condition and the second application condition described in the modification example 1 will be described.

Figures 16, 17:
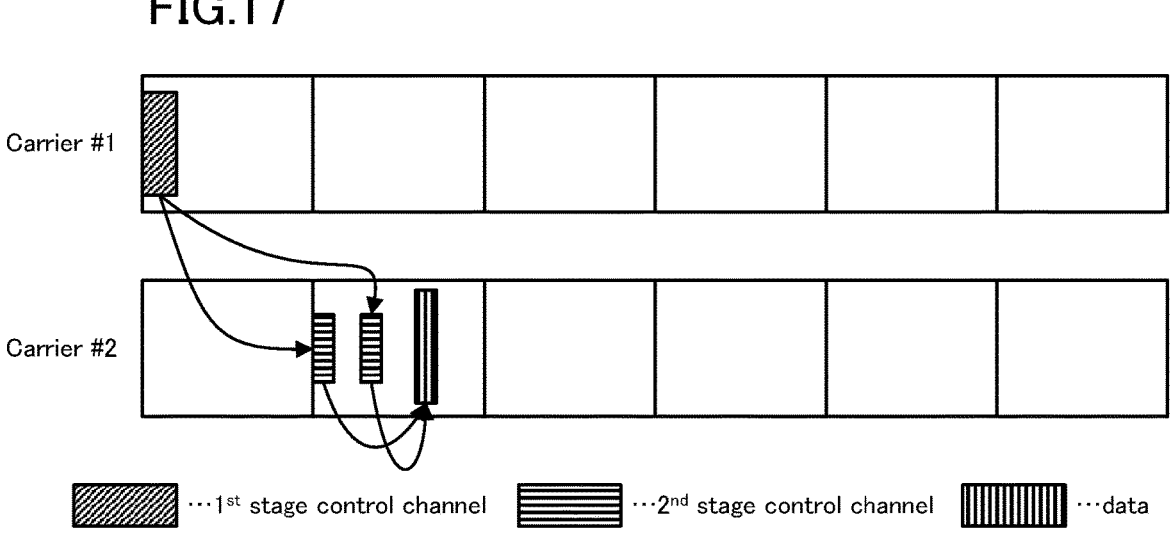
FIG. 16 is a diagram for explaining the 2-step control channel indication according to the modification 3.
FIG. 17 is a diagram for explaining the 2-step control channel indication according to the modification 3.

As shown in FIG. 16, the first application condition includes a condition regarding whether or not designation of the same $2^{nd}$ stage control channel (second control information) by two or more $1^{st}$ stage control channels (first control information) is permitted.

In option 1, the first application condition may include a condition that does not permit designation of the same $2^{nd}$ stage control channel (second control information) by two or more $1^{st}$ stage control channels (first control information).

In option 2, the first application condition may include a condition that permits designation of the same $2^{nd}$ stage control channel (second control information) by two or more $1^{st}$ stage control channels (first control information). In such a case, the latest first control information may be applied instead of the previous first control information. In other words, the previous first control information may be updated with the latest first control information.

The options described above may be applied depending on a combination of two or more elements selected from the higher layer configuration, the $2^{nd}$ stage control channel (e.g., DCI format in NR), and other control channels. The other control channel may be a control channel for each UE 200 or a group common control channel for a group of UE 200.

For example, as shown in FIG. 17, the second application condition includes a condition regarding whether or not designation of the same data by two or more $2^{nd}$ stage control channels (second control information) is permitted.

In option 1, the second application condition may include a condition that does not allow specification of the same data by two or more $2^{nd}$ stage control channels (second control information).

In option 2, the first application condition may include a condition that allows two or more $2^{nd}$ stage control channels to specify the same data. In such a case, the latest second control information may be applied instead of the previous second control information. In other words, the previous second control information may be updated by the latest second control information.

The options described above may be applied depending on a combination of two or more elements selected from the higher layer configuration, the $2^{nd}$ stage control channel (e.g., DCI format in NR), and other control channels. The other control channel may be a control channel for each UE 200 or a group common control channel for a group of UE 200.

Example 4

A fourth modification of the embodiment will be described below. Hereinafter, differences with respect to the embodiments will be mainly described.

In the embodiment, a case has been described in which one $1^{st}$ stage control channel (first control information) is used for scheduling one $2^{nd}$ stage control channel (second control information). On the other hand, in the modification example 4, a case where one $1^{st}$ stage control channel (first control information) is used for scheduling two or more $2^{nd}$ stage control channels (second control information) will be described.

(1) 2 Resource Mapping for $2^{nd}$ Stage Control Channel

In option 1, as in multi-PUSCH scheduling, the resource lengths of each of the two or more $2^{nd}$ stage control channels may be different. In such a case, the following further options may be considered. In modification 4, the resource may include a time domain resource or a frequency domain resource.

In option 1-1, two or more resources of the $2^{nd}$ stage control channel may be contiguous. In such a case, the $1^{st}$ stage control channel may include an information element that specifies the resource length of two or more $2^{nd}$ stage control channels. The $1^{st}$ stage control channel may include an information element that specifies a starting point for each of two or more resources in the $2^{nd}$ stage control channel.

In option 1-2, resources of 2 or more $2^{nd}$ stage control channels may be discontinuous. In such a case, the $1^{st}$ stage control channel may include information elements indicating the lengths and starting points of each of the two or more $2^{nd}$ stage control channel resources.

In option 2, each of the two or more $2^{nd}$ stage control channels may have the same resource length. In such a case, the following further options may be considered.

In option 2-1, two or more resources of the $2^{nd}$ stage control channel may be contiguous. In such a case, the $1^{st}$ stage control channel may include an information element that specifies a number of two or more $2^{nd}$ stage control channels. The starting point of the nth $2^{nd}$ stage control channel (n is an integer greater than or equal to 2) is the ending point of the nth $2^{nd}$ stage control channel. The starting point of the first $2^{nd}$ stage control channel may be specified by the $1^{st}$ stage control channel.

In option 2-2, two or more resources of the $2^{nd}$ stage control channel may be discontinuous. In such a case, the $1^{st}$ stage control channel may include an information element that indicates a starting point for each of two or more resources in the $2^{nd}$ stage control channel.

In option 3, two or more resources of the $2^{nd}$ stage control channel may be set by a higher layer and the set resources may be activated by the $1^{st}$ stage control channel (first control information). In such a case, a cycle of RVs is set by the higher layer, and each RV of two or more $2^{nd}$ stage control channels may differ according to the set cycle.

(2) $2^{nd}$ Stage Control Channel Fields

In option 1, the values of the specific fields contained in each of the two or more $2^{nd}$ stage control channels (second control information) may be the same. The specific field may include MCS, RV, NDI, TPC, etc. The value of the specific field included in the $2^{nd}$ stage control channel (second control information) may be the same as the value of the specific field included in the $1^{st}$ stage control channel (first control information).

In option 2, the values of the specific fields contained in each of the two or more $2^{nd}$ stage control channels (second control information) may be the same. The specific field may include MCS, RV, NDI, TPC, etc. The value of a specific field contained in each $2^{nd}$ stage control channel (second control information) may be specified by an information element contained in the 1st stage control channel (first control information).

Example 5

A fifth modification of the embodiment will be described below. Hereinafter, differences with respect to the embodiments will be mainly described.

In the embodiment, a case has been described in which one $2^{nd}$ stage control channel (second control information) is used for scheduling one piece of data. On the other hand, in the modification example 5, a case where one $2^{nd}$ stage control channel (second control information) is used for scheduling two or more pieces of data will be described.

(1) Data Resource Mapping

In option 1, as in multi-PUSCH scheduling, each resource length of two or more pieces of data may be different. In such a case, the following further options may be considered. In modification 5, the resource may include a time domain resource or a frequency domain resource.

In option 1-1, two or more data resources may be contiguous. In such a case, the $2^{nd}$ stage control channel may include an information element that specifies the resource length of two or more data. The $2^{nd}$ stage control channel may include an information element that specifies a starting point for each of the two or more data resources.

In option 1-2, two or more data resources may be discontinuous. In such a case, the $2^{nd}$ stage control channel may include information elements indicating the length and starting point of each of the two or more data resources.

In option 2, each resource of two or more data may have the same length. In such a case, the following further options may be considered.

In option 2-1, two or more data resources may be contiguous. In such a case, the $2^{nd}$ stage control channel may include an information element that specifies a number of two or more data. The starting point of the nth data (n is an integer of 2 or more) is the ending point of the nth data. The starting point of the first data may be specified by the $2^{nd}$ stage control channel.

In option 2-2, two or more data resources may be discontinuous. In such a case, the $2^{nd}$ stage control channel may include an information element that indicates a starting point for each of the two or more data resources.

In option 3, two or more data resources may be set by the higher layer and the set resources may be activated by the second $2^{nd}$ stage control channel. In such a case, a cycle of RVs may be set by the higher layer, and each RV of two or more data may differ according to the set cycle.

(2) Other Mappings

In option 1, the value of a particular field contained in one $2^{nd}$ stage control channel may be applied to all data. The specific field may include MCS, RV, NDI, TPC, etc.

In option 2, the value of the particular field applied to each of the two or more data may be different for each of the two or more data. The specific field may include MCS, RV, NDI, TPC, etc. The value of the specific field applied to each piece of data may be specified by an information element contained in the $2^{nd}$ stage control channel.

Example 6

A modified example 6 of the embodiment will be described below. Hereinafter, differences with respect to the embodiments will be mainly described.

In the modification 6, the restriction conditions related to the $1^{st}$ stage control channel (first control information), the $2^{nd}$ stage control channel (second control information), and the data transmission order (reception order) will be described.

First, the restriction conditions on the transmission order (reception order) of the $1^{st}$ stage control channel and the $2^{nd}$ stage control channel will be described. Such a constraint condition may be regarded as one of the first application conditions described above.

In option 1, as shown in FIG. 18, scheduling of the $2^{nd}$ stage control channel prior to the $1^{st}$ stage control channel may be allowed. In such a case, a time difference of symbol units may be assumed as the time difference between the $1^{st}$ stage control channel and the $2^{nd}$ stage control channel.

In option 2, as shown in FIG. 19, scheduling of the $2^{nd}$ stage control channel prior to the $1^{st}$ stage control channel may not be allowed.

Second, constraint conditions related to the $2^{nd}$ stage control channel and the data transmission order (reception order) will be described. Such a constraint condition may be regarded as one of the first application conditions described above.

Figure 20:
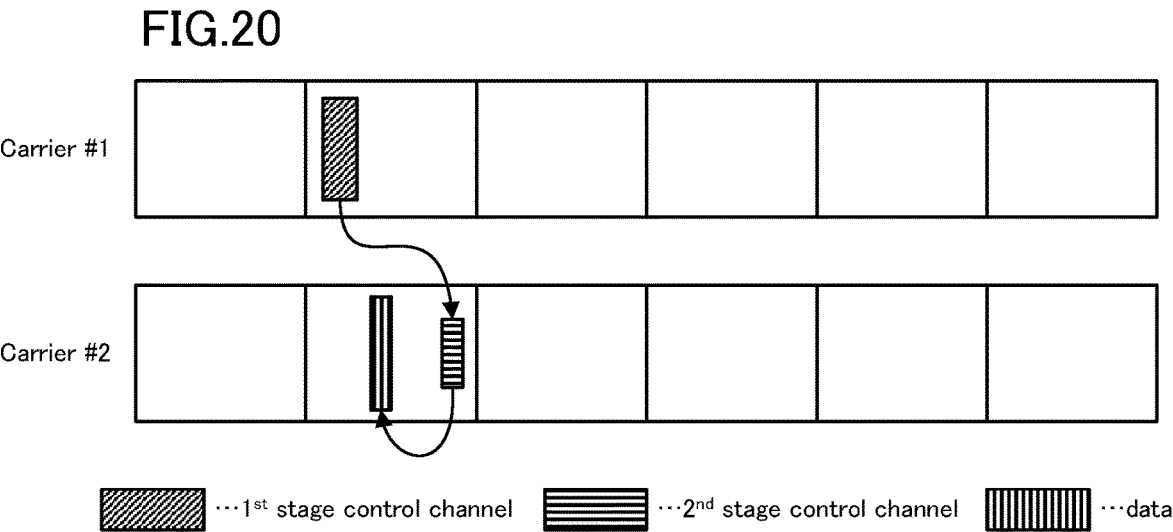
FIG. 20 is a diagram for explaining the 2 step control channel indication according to the modification 6.

In option 1, as shown in FIG. 20, scheduling of data prior to the $2^{nd}$ stage control channel may be allowed. In such a case, a time difference of symbol units may be assumed as the time difference between the $2^{nd}$ stage control channel and the data.

Figure 21:
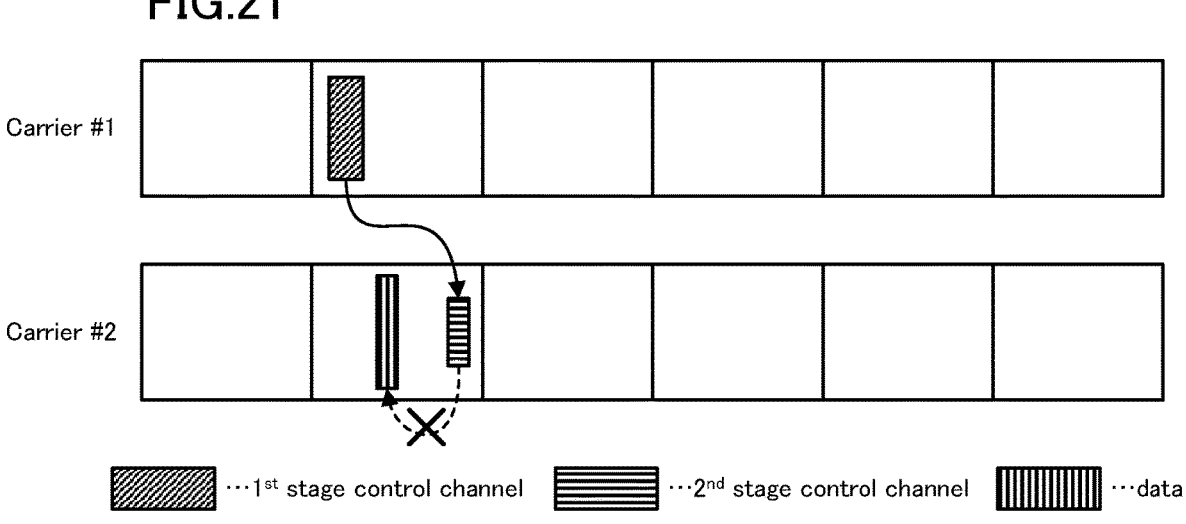
FIG. 21 is a diagram for explaining the 2 step control channel indication according to the modification 6.

In option 2, as shown in FIG. 21, scheduling of data prior to the $2^{nd}$ stage control channel may not be permitted.

Third, in a case where each of two or more $1^{st}$ stage control channels schedules a $2^{nd}$ stage control channel, a constraint on the order of the $2^{nd}$ stage control channels scheduled by each $1^{st}$ stage control channel will be described. Such a constraint condition may be regarded as one of the first application conditions described above.

Figures 22, 23:
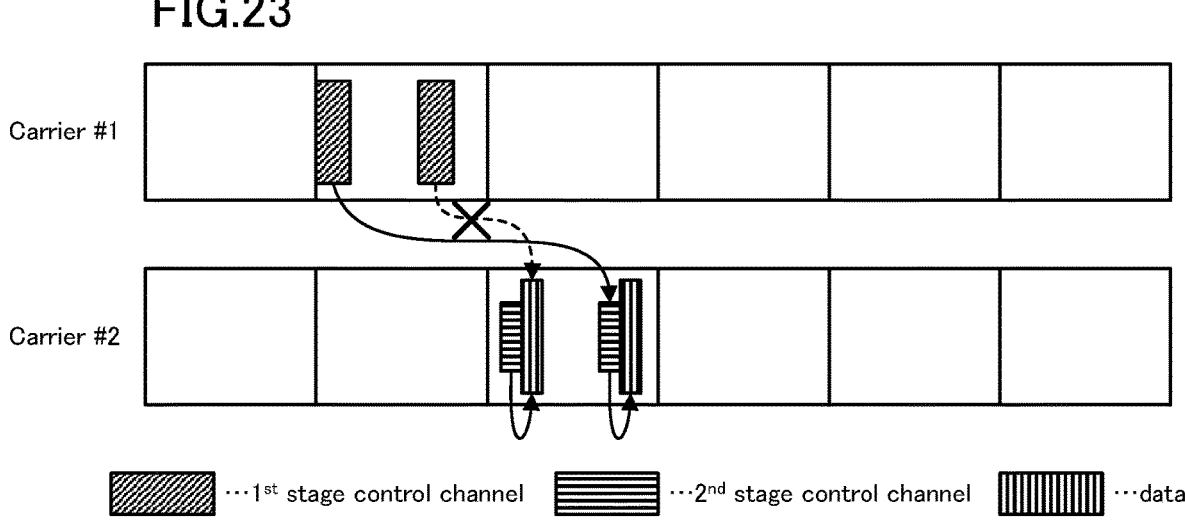
FIG. 22 is a diagram for explaining the 2 step control channel indication according to the modification 6.
FIG. 23 is a diagram for explaining the 2 step control channel indication according to the modification 6.

In option 1, as shown in FIG. 22, if the $1^{st}$ stage control channel at time i schedules the $2^{nd}$ stage control channel at time j, then the $1^{st}$ stage control channel at a time later than time i schedules the $2^{nd}$ stage control channel at a time earlier than time j (OOO; Out Of Order) may be allowed.

In option 2, as shown in FIG. 23, if the $1^{st}$ stage control channel at time i schedules the $2^{nd}$ stage control channel at time j, then the $1^{st}$ stage control channel at a time later than time i schedules the $2^{nd}$ stage control channel at a time earlier than time j (OOO; Out Of Order) may not be allowed.

Whether the OOO described above is permitted or not may be determined according to a combination of two or more elements selected from the configuration of the higher layer, the $1^{st}$ stage control channel (e.g., DCI format in NR), and other control channels. The other control channel may be a control channel for each UE 200 or a group common control channel for a group of UE 200. In addition, the options described above may be determined based on the UE capability of the UE 200.

Fourth, in a case where each of two or more $2^{nd}$ stage control channels schedules data, a constraint on the order of the data scheduled by each $2^{nd}$ stage control channel will be described. Such a constraint condition may be regarded as one of the above-mentioned second application conditions.

Figure 24:
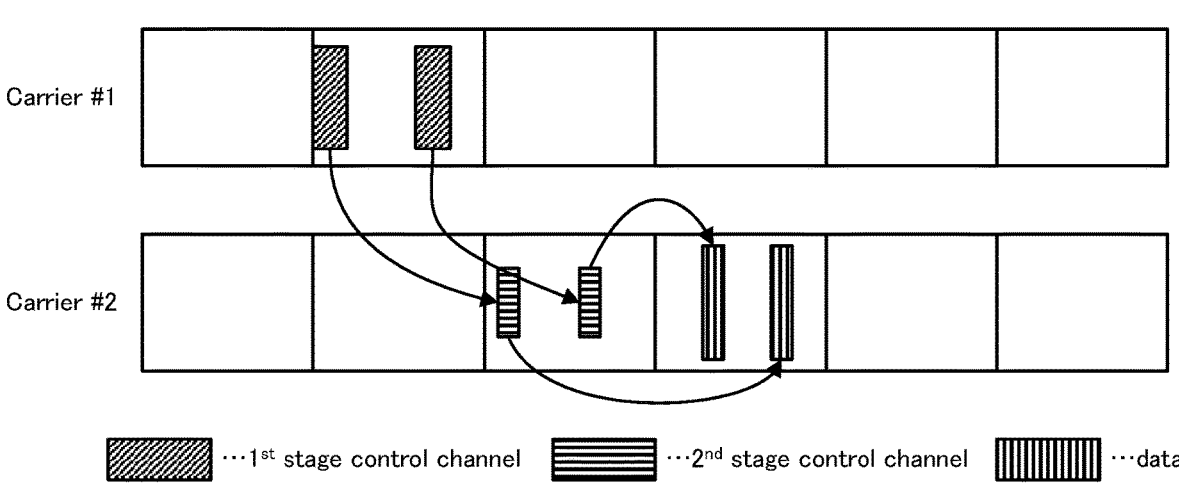
FIG. 24 is a diagram for explaining the 2 step control channel indication according to the modification 6.

In option 1, when the data at time j is scheduled by the $2^{nd}$ stage control channel at time i, as shown in FIG. 24, the scheduling of the data at a time earlier than time j by the $2^{nd}$ stage control channel at a time later than time i (OOO; Out Of Order) may be allowed.

Figure 25:
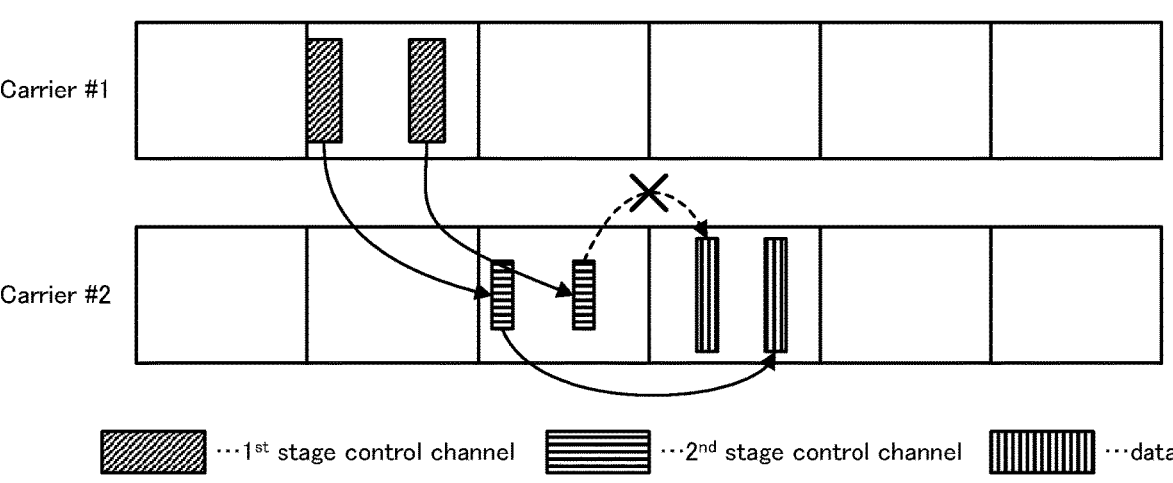
FIG. 25 is a diagram for explaining the 2 step control channel indication according to the modification 6.

In option 2, when the data at time j is scheduled by the $2^{nd}$ stage control channel at time i, as shown in FIG. 25, the scheduling of the data at a time earlier than time j by the $2^{nd}$ stage control channel at a time later than time i (OOO; Out Of Order) may not be allowed.

Whether the OOO described above is permitted or not may be determined according to a combination of two or more elements selected from the configuration of the higher layer, the $2^{nd}$ stage control channel (e.g., DCI format in NR), and other control channels. The other control channel may be a control channel for each UE 200 or a group common control channel for a group of UE 200. In addition, the options described above may be determined based on the UE capability of the UE 200.

Example 7

A modified example 7 of the embodiment will be described below. Hereinafter, differences with respect to the embodiments will be mainly described.

In Modified Example 7, other restriction conditions related to the $1^{st}$ stage control channel and the $2^{nd}$ stage control channel will be described. Such a constraint condition may be regarded as one of the first application conditions described above.

In option 1, carrier #1 for the $1^{st}$ stage control channel and carrier #2 for the $2^{nd}$ stage control channel may be carriers belonging to the same BWP, the same CC or the same band. In such a case, the $1^{st}$ stage control channel and the $2^{nd}$ stage control channel may be mapped to the same time interval. The time interval may be defined in symbol units, slot units, subframe units, or frame units.

In option 2, carrier #1 for the $1^{st}$ stage control channel and carrier #2 for the $2^{nd}$ stage control channel may be carriers belonging to different BWPs, different CCs or different bands. In such a case, if the SCS of carrier #1 and carrier #2 are different, the time difference between the $1^{st}$ stage control channel and the $2^{nd}$ stage control channel may be equal to or greater than the time offset. As the time offset, a time offset specified in Release 16 of 3 GPP may be used or a newly defined time offset may be used. The time offset may be referred to as preparation time. For example, if the SCS of carrier #1 is 15 kHz and the SCS of carrier #2 is 30 kHz, the preparation time may be 4 symbols. If carrier #1 and carrier #2 have the same SCS, then the $1^{st}$ stage control channel and the $2^{nd}$ stage control channel may be mapped to the same time interval in different frequency resources. The time interval may be defined in symbol units, slot units, subframe units, or frame units.

In option 2, parameters such as search space and CORSET for the $2^{nd}$ stage control channel need not be set by the higher layer.

Other Embodiments

Although the contents of the present invention have been described in accordance with the embodiments described above, it is obvious to those skilled in the art that the present invention is not limited to these descriptions and that various modifications and improvements are possible.

In the above disclosure, the two-step control channel indication may be applied to DL and may be applied to UL. May be applied to SL (Side Link).

In the above disclosure, at least one of the $1^{st}$ stage control channel and the $2^{nd}$ stage control channel may be PDCCH or PSCCH (Physical Sidelink Control Channel).

In the above disclosure, the channel for transmitting data may be PDSCH, PUSCH, or PSSCH (Physical Sidelink Shared Channel).

In the above disclosure, the $2^{nd}$ stage control channel may be multiplexed over a data channel (For example, PDSCH). The second control information may be treated as data.

The block diagrams (FIGS. 4 and 5) used in the description of the above-described embodiment show blocks in units of functions. Those functional blocks (structural components) can be realized by a desired combination of at least one of hardware and software. Means for realizing each functional block is not particularly limited. That is, each functional block may be implemented using a physically or logically coupled device, or may be implemented using two or more physically or logically separated devices connected directly or indirectly (For example, by using wired, wireless, etc.). The functional block may be implemented by combining software with the one device or the plurality of devices.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 26:
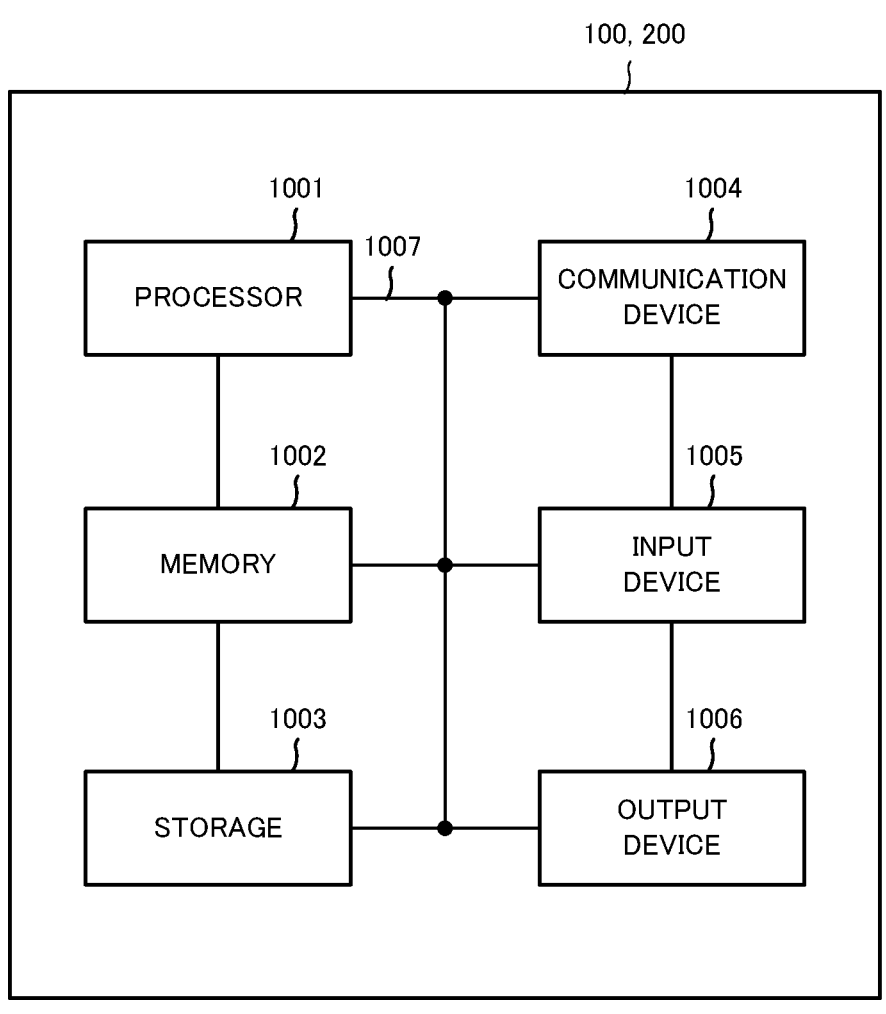
FIG. 26 shows an example of a hardware configuration of a gNB 100 or UE 200.

Further, the above-mentioned gNB 100 and UE 200 (the apparatus) may function as a computer that performs processing of the radio communication method of the present disclosure. FIG. 26 is a diagram showing an example of a hardware configuration of the apparatus. As shown in FIG. 26, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. The hardware configuration of the device may be configured to include one or more of the devices shown in the figure, or may be configured to exclude some of the devices.

Each functional block of the device (see FIG. 4) is implemented by any hardware element or combination of hardware elements of the computer device.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Further, the various processes described above may be executed by one processor 1001, or may be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

In addition, the device may comprise hardware such as a microprocessor, a digital signal processor (DSP), an application specific integrated circuit (ASIC), a programmable logic device (PLD), a field programmable gate array (FPGA), and the hardware may implement some or all of each functional block. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network comprising one or more network nodes having a base station, it is apparent that various operations performed for communication with a terminal may be performed by the base station and at least one of other network nodes (For example, but not limited to MME or S-GW) other than the base station. In the above, an example in which there is one network node other than the base station is explained; however, a combination of a plurality of other network nodes (for example, MME and S-GW) may be used.

Information and signals (information, etc.) can be output from a higher layer (or a lower layer) to a lower layer (or a higher layer). It may be input and output via a plurality of network nodes.

The input/output information can be stored in a specific location (for example, a memory) or can be managed in a management table. The input and output information may be overwritten, updated, or appended. The information can be deleted after outputting. The inputted information can be transmitted to another device.

The determination may be made by a value represented by one bit (0 or 1), by a Boolean value (Boolean: true or false), or by a comparison of numerical values (For example, comparison with a given value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if software is transmitted from a website, server, or other remote source using at least one of wired (Coaxial cable, fiber-optic cable, twisted-pair, digital subscriber line (DSL), etc.) and wireless (Infrared, microwave, etc.) technologies, at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltages, currents, electromagnetic waves, magnetic fields or magnetic particles, optical fields or photons, or any combination thereof.

It should be noted that terms described in this disclosure and terms necessary to understand this disclosure may be replaced with terms having the same or similar meaning. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station may house one or more (For example, three) cells, also referred to as sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a portion or the entire coverage area of at least one of a base station and a base station subsystem performing communication services in this coverage.

In the present disclosure, the terms "mobile station (Mobile Station: MS)", "user terminal", "user equipment (User Equipment: UE)", "terminal" and the like can be used interchangeably.

A mobile station may be referred to by one skilled in the art as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, the mobile station in the present disclosure may be read as a base station. In this case, the base station may have the function of the mobile station.

The radio frame may comprise one or more frames in the time domain. Each frame or frames in the time domain may be referred to as a sub-frame.

The subframe may further comprise one or more slots in the time domain. The subframe may be a fixed time length (For example, 1 ms) independent of the numerology.

Pneumerology may be a communication parameter applied to at least one of transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may comprise one or more symbols (Orthogonal Frequency Division Multiplexing (OFDM)) symbols, single carrier frequency division multiple access (SC-FDMA) symbols, etc.) in the time domain. A slot may be a unit of time based on the numerology.

A slot may include a plurality of minislots. Each minislot may comprise one or more symbols in the time domain. A minislot may also be called a subslot. A minislot may be composed of fewer symbols than slots. A PDSCH (or PUSCH) transmitted in time units larger than the minislot may be referred to as a PDSCH (or PUSCH) mapping type A. A PDSCH (or PUSCH) transmitted using a minislot may be referred to as a PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be referred to as the transmission time interval (TTI), a plurality of consecutive subframes may be referred to as TTI, and one slot or one minislot may be referred to as TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (That is, one or more slots or one or more minislots) may be the minimum time unit for scheduling. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. A TTI shorter than a normal TTI may be referred to as a shortened TTI, a short TTI, a partial or fractional TTI, a shortened subframe, a short subframe, a minislot, a subslot, a slot, or the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and the frequency domain, and may include one or more continuous subcarriers in the frequency domain. The number of subcarriers included in RB may be, for example, twelve, and the same regardless of the topology. The number of subcarriers included in the RB may be determined based on the neurology.

The time domain of the RB may also include one or more symbols and may be one slot, one minislot, one subframe, or one TTI in length. The one TTI, one subframe, and the like may each comprise one or a plurality of resource blocks.

The one or more RBs may be referred to as a physical resource block (PRB), a sub-carrier group (SCG), a resource element group (REG), a PRB pair, an RB pair, or the like.

The resource block may comprise one or more resource elements (REs). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or more BWPs may be set in one carrier for the UE.

At least one of the configured BWPs may be active, and the UE may not expect to send and receive certain signals/ channels outside the active BWP. Note that "cell", "carrier", and the like in this disclosure may be read as "BWP".

The above-described structures such as a radio frame, subframe, slot, minislot, and symbol are merely examples. For example, the number of subframes contained in a radio frame, the number of slots per subframe or radio frame, the number of minislots contained in a slot, the number of symbols and RBs contained in a slot or minislot, the number of subcarriers contained in an RB, and the number of symbols, symbol length, and cyclic prefix (CP) length in a TTI may be varied in various ways.

The term "connected", "coupled", or any variation thereof, refers to any direct or indirect connection or coupling between two or more elements and may include the presence of one or more intermediate elements between two elements that are "connected" or "coupled" to each other. The coupling or connection between the elements may be physical, logical, or a combination thereof. For example, "connection" may be read as "access". As used in the present disclosure, the two elements may be considered to be "connected" or "coupled" to each other using at least one of one or more electrical wires, cables and printed electrical connections and, as some non-limiting and non-comprehensive examples, electromagnetic energy having wavelengths in the radio frequency region, microwave region and light (both visible and invisible) region.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to elements using the designation "first," "second," etc., as used in this disclosure does not generally limit the amount or order of those elements. Such designations can be used in the present disclosure as a convenient way to distinguish between two or more elements. Thus, references to the first and second elements do not imply that only two elements may be employed therein, or that the first element must in some way precede the second element.

In the present disclosure, the used terms "include", "including", and variants thereof are intended to be inclusive in a manner similar to the term "comprising". Furthermore, the term "or" as used in this disclosure is not intended to be an exclusive OR.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or"decision" may include regarding some action as "judgment" or"decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN

100 gNB
110 Reception unit
120 Transmission unit
130 Control unit
200 UE
210 Radio signal transmission/reception unit
220 Amplifier unit
230 Modulation/demodulation unit
240 Control signal/reference signal processing unit
250 Encoding/decoding unit
260 Data transmission/reception unit
270 Control unit
1001 Processor
1002 Memory
1003 Storage
1004 Communication device
1005 Input device
1006 Output device
1007 Bus

The invention claimed is:

1. A terminal comprising:

a receiver that receives a first control information by a first control channel on a first carrier and a second control information by a second control channel on a second carrier, a subcarrier spacing of the second carrier being greater than a subcarrier spacing of the first carrier, the first carrier belonging to a first frequency range, the second carrier belonging to a second frequency range; and a processor that controls the reception of the second control information by the second control channel on the second carrier based on the first control information received on the first carrier, and controls communication of data by a data channel on the second carrier based on the second control information received on the second carrier.

2. The terminal according to claim 1, wherein the processor specifies at least one of a time domain resource and a frequency domain resource of the second control channel based on the first control information, or specifies at least one of a time domain resource and a frequency domain resource of the second control channel based on a configuration of a higher layer.

3. The terminal according to claim 1, wherein the first control information includes an information element for specifying at least one of a number of control channel elements allocable to the second control channel and a format of the second control channel.

4. A base station comprising:

a transmitter that transmits a first control information by a first control channel on a first carrier and a second control information by a second control channel on a second carrier, a subcarrier spacing of the second carrier being greater than a subcarrier spacing of the first carrier, the first carrier belonging to a first frequency range, the second carrier belonging to a second frequency range; and a processor that controls the transmission of the second control information by the second control channel on the second carrier based on the first control information received on the first carrier, and controls communication of data based by a data channel on the second carrier on the second control information received on the second carrier.

5. A radio communication method comprising the steps of:

receiving a first control information by a first control channel on a first carrier and a second control information by a second control channel on a second carrier, a subcarrier spacing of the second carrier being greater than a subcarrier spacing of the first carrier, the first carrier belonging to a first frequency range, the second carrier belonging to a second frequency range;

controlling the reception of the second control information by the second control channel on the second carrier based on the first control information received on the first carrier;

and controlling communication of data by a data channel on the second carrier based on the second control information received on the second carrier.

* * * * *